(12) United States Patent
Gupta et al.

(10) Patent No.: US 12,572,806 B2
(45) Date of Patent: Mar. 10, 2026

(54) SYSTEMS, METHODS, AND MEDIA FOR GENERATING AND USING NEURAL NETWORKS HAVING IMPROVED EFFICIENCY FOR ANALYZING VIDEO

(71) Applicant: WISCONSIN ALUMNI RESEARCH FOUNDATION, Madison, WI (US)

(72) Inventors: Mohit Gupta, Madison, WI (US); Matthew Dutson, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 914 days.

(21) Appl. No.: 17/747,545

(22) Filed: May 18, 2022

(65) Prior Publication Data

US 2023/0376766 A1 Nov. 23, 2023

(51) Int. Cl.
| | |
|---|---|
| *G06N 3/082* | (2023.01) |
| *G06N 3/048* | (2023.01) |
| *G06V 10/82* | (2022.01) |

(52) U.S. Cl.
CPC ............. *G06N 3/082* (2013.01); *G06N 3/048* (2023.01); *G06V 10/82* (2022.01)

(58) Field of Classification Search
CPC ......... G06N 3/082; G06N 3/048; G06V 10/82
See application file for complete search history.

(56) References Cited

PUBLICATIONS

Parger, Mathias, et al. "DeltaCNN: End-to-End CNN Inference of Sparse Frame Differences in Videos." arXiv preprint arXiv: 2203. 03996 (2022). (Year: 2022).*
Zickus, Vytautas, et al. "Fluorescence lifetime imaging with a megapixel SPAD camera and neural network lifetime estimation." Scientific Reports 10.1 (2020): 20986. (Year: 2020).*
Eilertsen, Gabriel, et al. "HDR image reconstruction from a single exposure using deep CNNs." ACM transactions on graphics (TOG) 36.6 (2017): 1-15. (Year: 2017).*

(Continued)

*Primary Examiner* — Eric Nilsson
(74) *Attorney, Agent, or Firm* — Andrus Intellectual Property Law, LLP

(57) ABSTRACT

In accordance with some embodiments, systems, methods, and media for generating and using neural networks having improved efficiency for analyzing video are provided. In some embodiments, the method comprises: providing image data to a trained neural network; receiving, at a neuron, a delta-based input $\Delta_{in}$ from a previous layer; generating an output $g(\Delta_{in})$ of a linear transform g; generating an updated state variable a based on $g(\Delta_{in})$ and a current a; generating an output $f(a)$ of an activation function $f$ based on updated a; generating an updated state variable d based on a current d, a state variable b, and $f(a)$; generating an updated b based on output $f(a)$; transmitting d to a next layer based on a transmission policy and subtracting the value from d; and receiving an output from the trained neural network that represents a prediction based on the image data.

19 Claims, 8 Drawing Sheets

(56) References Cited

PUBLICATIONS

Cavigelli et al., CBinder: Change-Based Inference for Convolutional Neural Networks on Video Data, ICDSC 2017: Proceedings of the 11th International Conference on Distributed Smart Cameras https://dl.acm.org/doi/abs/10.1145/3131885.3131906.

Dutson et al., (2021) Event Neural Networks, arXiv:2112.00891v1 [cs.CV].

Habibian et al., Skip-Convolutions for Efficient Video Processing CVPR 2021: Proceedings of the IEEE/CVF Conference on Computer Vision and Pattern Recognition https://openaccess.thecvf.com/content/CVPR2021/html/Habibian_Skip-Convolutions_for_Efficient_Video_Processing_CVPR_2021_paper.html.

O'Connor et al., Sigma Delta Quantized Networks, ICLR 2017: Proceedings of the 5th International Conference on Learning Representations https://openreview.net/forum?id=HkNRsU5ge.

Parger et al., DeltaCNN: End-to-End CNN Inference of Sparse Frame Differences in Videos, CVPR 2022: Proceedings of the IEEE/CVF Conference on Computer Vision and Pattern Recognition https://arxiv.org/abs/2203.03996.

* cited by examiner

<u>700</u>

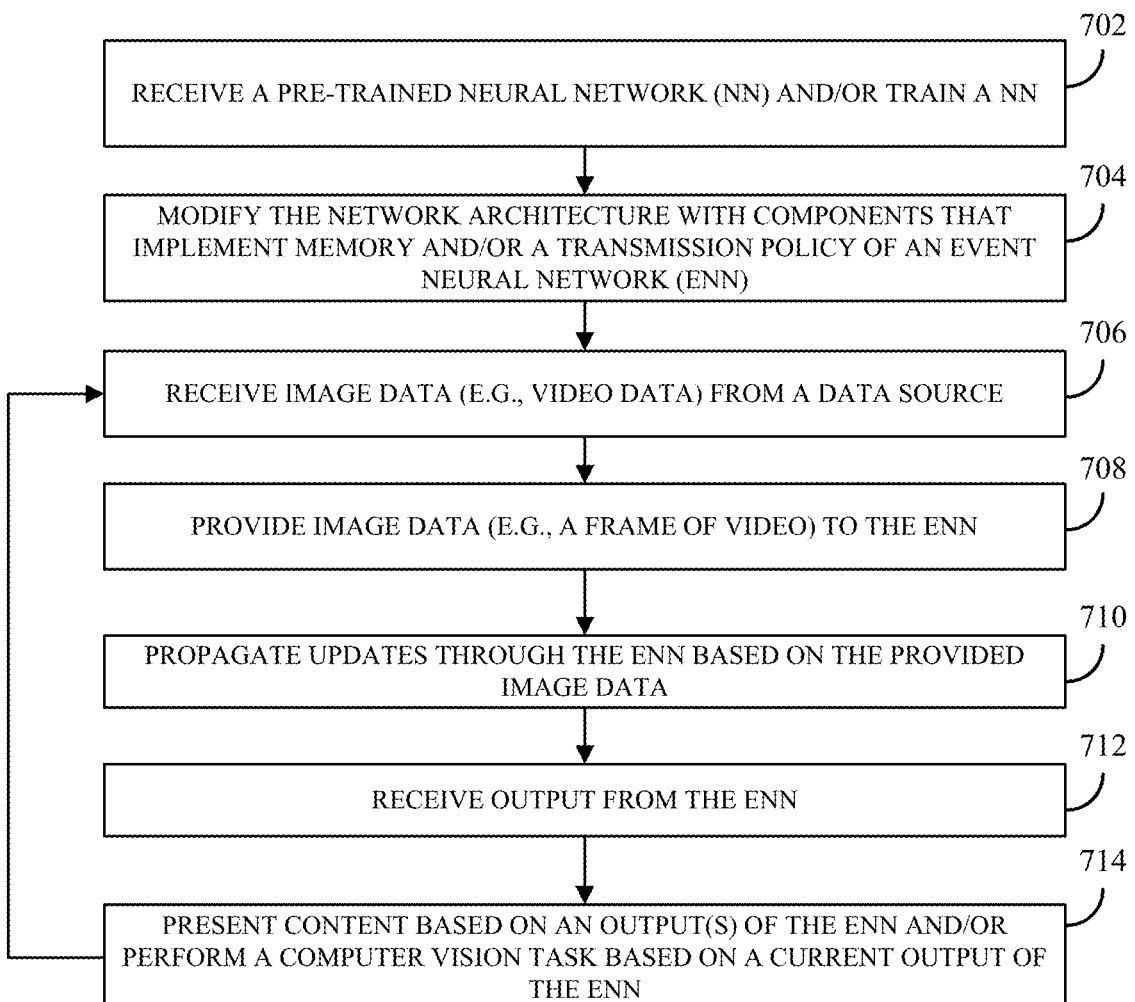

RECEIVE A PRE-TRAINED NEURAL NETWORK (NN) AND/OR TRAIN A NN — 702

MODIFY THE NETWORK ARCHITECTURE WITH COMPONENTS THAT IMPLEMENT MEMORY AND/OR A TRANSMISSION POLICY OF AN EVENT NEURAL NETWORK (ENN) — 704

RECEIVE IMAGE DATA (E.G., VIDEO DATA) FROM A DATA SOURCE — 706

PROVIDE IMAGE DATA (E.G., A FRAME OF VIDEO) TO THE ENN — 708

PROPAGATE UPDATES THROUGH THE ENN BASED ON THE PROVIDED IMAGE DATA — 710

RECEIVE OUTPUT FROM THE ENN — 712

PRESENT CONTENT BASED ON AN OUTPUT(S) OF THE ENN AND/OR PERFORM A COMPUTER VISION TASK BASED ON A CURRENT OUTPUT OF THE ENN — 714

FIG. 7

| Model | None | Minor | Major |
|---|---|---|---|
| OpenPose | 17.3x | 11.3x | 8.40x |
| YOLO | 6.64x | 3.95x | 2.65x |
| HDRNet-a | 6.19x | 6.02x | 5.55x |
| HDRNet-f | 34.9x | 29.7x | 20.0x |
| PWC-Net | 5.41x | 3.29x | 2.11x |

| Model | Savings | Agreement | Overhead |
|---|---|---|---|
| OpenPose | 10.1x | 0.904 PCK | 0.12 % / 0.21 % |
| YOLO | 3.33x | 0.817 mAP50 | 0.59 % / 0.98 % |
| HDRNet-a | 5.78x | 39.4 PSNR | 2.57 % / 3.79 % |
| HDRNet-f | 23.9x | 39.4 PSNR | 2.57 % / 3.79 % |
| PWC-Net | 2.68x | 0.335 EPE | 0.44 % / 0.74 % |

| Model | Savings | Conventional | Event |
|---|---|---|---|
| OpenPose | 10.4x | 0.709 PCKh | 0.688 PCKh |
| PWC-Net | 1.89x | 2.86 EPE | 3.33 EPE |

| Variant | Threshold | PCK | GOps |
|---|---|---|---|
| Conventional | – | 1.000 | $1.38 \times 10^{11}$ |
| No chunking | 0.05 | 0.905 | $1.44 \times 10^{10}$ |
| $2 \times 2$ chunks | $0.05/\sqrt{2}$ | 0.904 | $2.10 \times 10^{10}$ |
| $4 \times 4$ chunks | $0.05/\sqrt{4}$ | 0.899 | $3.01 \times 10^{10}$ |
| $8 \times 8$ chunks | $0.05/\sqrt{8}$ | 0.885 | $4.16 \times 10^{10}$ |
| Channels | 0.02 | 0.876 | $4.78 \times 10^{10}$ |

SYSTEMS, METHODS, AND MEDIA FOR GENERATING AND USING NEURAL NETWORKS HAVING IMPROVED EFFICIENCY FOR ANALYZING VIDEO

STATEMENT REGARDING FEDERALLY SPONSORED RESEARCH

This invention was made with government support under 1943149 awarded by the National Science Foundation. The government has certain rights in the invention.

CROSS-REFERENCE TO RELATED APPLICATIONS

N/A

BACKGROUND

In recent years, improvements in computer vision tasks have focused on improving accuracy. For example, over the past decade, the computer vision community has largely embraced an "accuracy first" philosophy in which "state-of-the-art" usually implies achieving the highest accuracy for a particular task. However, improved accuracy for a particular task may not be useful practically if the task cannot be performed quickly (e.g., with low latency), or if the amount of power expended to perform the task is relatively high.

Accordingly, new systems, methods, and media for generating and using neural networks having improved efficiency for analyzing video are desirable.

SUMMARY

In accordance with some embodiments of the disclosed subject matter, systems, methods, and media for generating and using neural networks having improved efficiency for analyzing video are provided.

In accordance with some embodiments of the disclosed subject matter, a method for using a neural network with improved efficiency is provided, the method comprising: receiving image data; providing the image data to a trained neural network, the trained neural network comprising a plurality of neurons; receiving, at a neuron of the plurality of neurons, a delta-based input $\Delta_{in}$ provided from a previous layer of the trained neural network; generating, for the neuron, an output $g(\Delta_{in})$ of a linear transform g based on $\Delta_{in}$; generating, for the neuron, an updated value of a state variable a based on $g(\Delta_{in})$ and a value of the state variable a at a time when $\Delta_{in}$ is received; generating, for the neuron, an output $f(a)$ of an activation function $f$ based on the updated value of the state variable a; generating, for the neuron, an updated value of a state variable d based on a value of the state variable d, a value of a state variable b corresponding to a previous output of the activation function, and the output $f(a)$; generating, for the neuron subsequent to updating the value of the state variable d, an updated value of the state variable b based on the output $f(a)$; determining whether to transmit the value of the state variable d based on a transmission policy and the updated value of the state variable d; in response to determining that the value of state variable d is to be transmitted, transmitting the value of the state variable d to a next layer of the trained neural network; in response to transmitting the value of state variable d to the next layer, subtracting the transmitted value from the state variable d; and receiving an output from the trained neural network, wherein the output from the trained neural represents a prediction based on the image data.

In some embodiments, the transmission policy is applied to each of the plurality of neurons individually, and comprises a threshold value h, and wherein determining whether to transmit the updated value of the state variable d based on the transmission policy and the value of the state variable d comprises determining whether |d| satisfies the threshold value h.

In some embodiments, image data is a frame of video data, and the previous output of the activation function was generated based on a prior frame of video data.

In some embodiments, the image data comprises data generated by an image sensor comprising a plurality of single photon detectors.

In some embodiments, the plurality of neurons are included in a single layer of the neural network, and wherein a state tensor a is associated with the single layer of the neural network, and stores the state tensor a for each of the plurality of neurons.

In some embodiments, the value of the state variables a, b, and d are stored in memory and are associated with the neuron.

In some embodiments, the output comprises an image with higher dynamic range than the image data.

In some embodiments, the output comprises object detection information indicative of the location of one or more objects in the image data.

In accordance with some embodiments of the disclosed subject matter, a system for using a neural network with improved efficiency is provided, the system comprising: at least one processor that is configured to: receive image data; provide the image data to a trained neural network, the trained neural network comprising a plurality of neurons; receive, at a neuron of the plurality of neurons, a delta-based input $\Delta_{in}$ provided from a previous layer of the trained neural network; generate, for the neuron, an output $g(\Delta_{in})$ of a linear transform g based on $\Delta_{in}$; generate, for the neuron, an updated value of a state variable a based on $g(\Delta_{in})$ and a value of the state variable a at a time when $\Delta_{in}$ is received; generate, for the neuron, an output $f(a)$ of an activation function $f$ based on the updated value of the state variable a; generate, for the neuron, an updated value of a state variable d based on a value of the state variable d, a value of a state variable b corresponding to a previous output of the activation function, and the output $f(a)$; generate, for the neuron subsequent to updating the value of the state variable d, an updated value of the state variable b based on the output $f(a)$; determine whether to transmit the value of the state variable d based on a transmission policy and the updated value of the state variable d; in response to determining that the value of state variable d is to be transmitted, transmit the value of the state variable d to a next layer of the trained neural network; in response to transmitting the value of state variable d to the next layer, subtracting the transmitted value from the state variable d; and receive an output from the trained neural network, wherein the output from the trained neural represents a prediction based on the image data.

In accordance with some embodiments of the disclosed subject matter, a method for modifying a neural network to operate with improved efficiency is provided, the method comprising: receiving a trained neural network; adding a first gate layer configured to: receive a plurality of values and output a plurality of differentials to a layer comprising a corresponding plurality of neurons, each configured to perform a linear transform, where each differential is based on a difference between a value of the plurality of values and a corresponding previously received value of a plurality of previously received values; adding an accumulator layer configured to: receive an output from each of the plurality of neurons; store a corresponding plurality of state variables a based on the output received from the corresponding neuron; and output current values of the plurality of state variables a to a layer configured to perform a non-linear activation; and adding a second gate layer configured to generate, in connection with each of the plurality of neurons, an updated value of a state variable d based on a value of the state variable d, a value of a state variable b corresponding to a previous output of the non-linear activation function, and the output the non-linear activation function; generate, for the neuron subsequent to updating the value of the state variable d, an updated value of the state variable b based on the output of the non-linear activation function; and storing a modified version of the neural network including at least the first gate layer, the accumulator layer, and the second gate layer in memory.

In some embodiments, the method further comprises: causing a transmission policy to be applied to each neuron, the transmission policy comprising a threshold value h, and causing transmission of the value of the state variable d to be inhibited unless |d|>h.

In some embodiments, the method further comprises: configuring the second gate layer to set to transmit the updated value of the state variable d and subtract the transmitted value from the state variable d in response determining that the value of d satisfies the transmission policy.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

4 as an event neural network in accordance with some embodiments of the disclosed subject matter.

FIG. 7 shows an example of a process for generating and using an even neural network with improved efficiency to analyze image data in accordance with some embodiments of the disclosed subject matter.

Figures 8, 9, 10, 11:
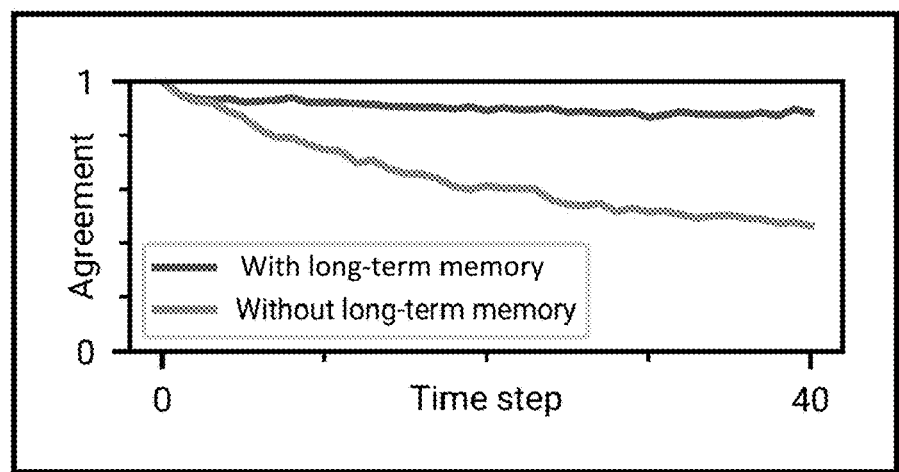

FIG. 8 shows an example of errors that can accumulate due to lack of sufficient long-term memory in an event neural network in accordance with some embodiments of the disclosed subject matter.

FIG. 9 shows examples of efficiency improvements that can be realized using mechanisms described herein to modify existing neural networks that perform different computer vision tasks in accordance with some embodiments of the disclosed subject matter based on video data with various levels of camera motion.

FIG. 10 shows examples of efficiency improvements that can be realized using mechanisms described herein to modify existing neural networks, metrics indicative of performance of the network with modifications in accordance with some embodiments of the disclosed subject matter, and overhead attributable to modifications associated with modifying the networks as event neural networks.

FIG. 11 shows examples of efficiency improvements that can be realized using mechanisms described herein to modify existing neural networks in accordance with some embodiments of the disclosed subject matter, and metrics indicative of comparative performance of the networks with and without modifications.

Figures 12, 13, 14:
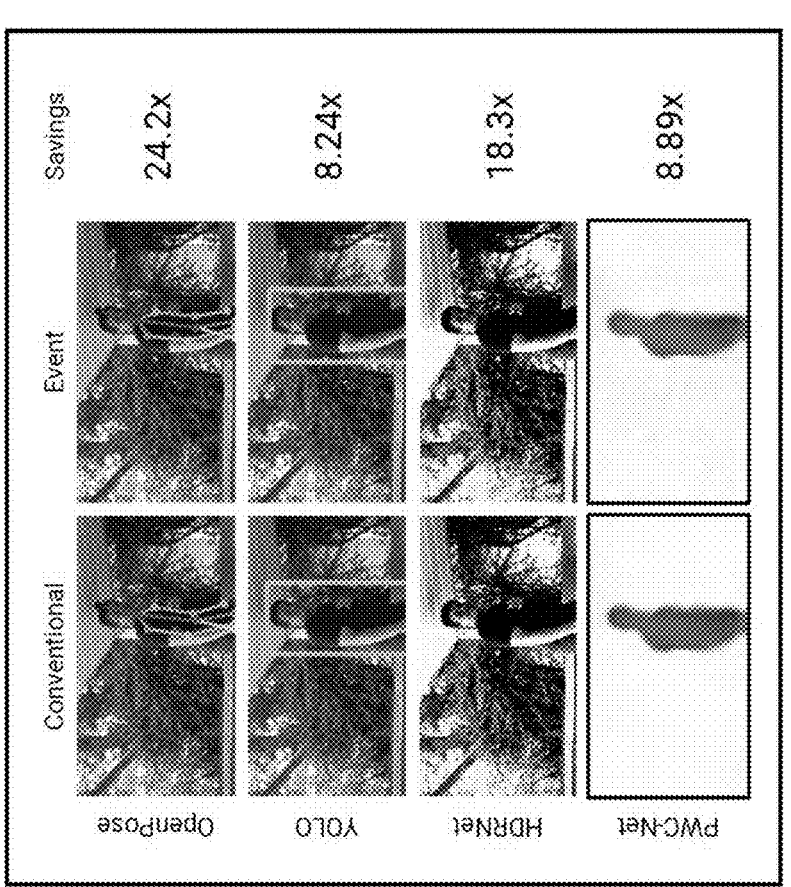

FIG. 12 shows examples of efficiency improvements that can be realized using mechanisms described herein to modify existing neural networks in accordance with some embodiments of the disclosed subject matter, and results of computer vision tasks generated by the networks with and without modifications.

FIG. 13 shows examples of efficiency improvements that can be realized using mechanisms described herein and the impact of transmission policies with various levels of granularity in accordance with some embodiments of the disclosed subject matter.

FIG. 14 shows an example of the computational cost at various layers of a particular network modified as an event neural network in accordance with some embodiments of the disclosed subject matter as a fraction of the computational cost of the network without modifications.

DETAILED DESCRIPTION

In accordance with various embodiments, mechanisms (which can, for example, include systems, methods, and media) for neural networks having improved efficiency for analyzing video are provided.

Real-world visual data typically includes portions that are repetitive over time. Such portions can be described as having the property of persistence. For example, with a typical frame rate, the value of a pixel at time t correlates strongly with the values of that pixel at time t±1. In a particular example, as described below in connection with FIG. 3, panel (a), frames t and t+1, despite being separated by one second, appear quite similar. Human vision relies on the persistent nature of visual data to allocate scarce perceptual resources. For example, instead of constantly ingesting the entire scene at maximum resolution, the human visual system points a small region of dense receptor cells (referred to as the fovea) at areas containing motion or detail. This allocation of attention reduces visual processing and eye-to-brain communication.

In contrast, many state-of-the-art neural networks operate without an assumption of temporal continuity. For example, many conventional neural networks process each frame of visual data independently, implicitly assuming that all frames (e.g., including adjacent frames of video) are statistically independent. This assumption can lead to inefficient use of resources due to the repeated processing of image regions containing little or no new information.

One potential solution is to skip processing image regions containing few changes in low-level pixel values. However, such methods (e.g., including event cameras and neural networks designed for data generated by event cameras) cannot recognize persistence in features such as textures, patterns, and/or high-level semantics when such features do not coincide with consistent pixel values.

Note that because neural networks extract a hierarchy of features from the network inputs, such neural networks contain a built-in lens for detecting repetition across many levels of complexity. For example, shallow layers can detect low-level patterns, and deeper layers can detect higher-level semantics. Temporal repetition at a given level of complexity can translate to persistent values in the corresponding portion of the neural hierarchy. For example, if the pixel values remain relatively constant, the values in the shallow layers and the deeper layers can be expected to remain relatively constant. As another example, if the pixel values change while textures, patterns, and/or higher-level semantics remain relatively constant (e.g., camera motion may cause pixel values to change, while the composition of a frame as a whole remains relatively consistent), the values in the shallow layers can be expected to change to reflect changes in lower level features, while the deeper layers can be expected to remain relatively constant.

In some embodiments, mechanisms described herein can be used to implement event neural networks (sometimes referred to herein as EvNets, and sometimes referred to herein as ENNs), a family of neural networks in which neurons can be configured to transmit (e.g., thereby triggering downstream computation) only when there is a significant change in the activation of that neuron. For example, neurons can be configured to fire only when the neuron has something "interesting" to say. Applying such a strategy to neurons over multiple layers (e.g., up to every neuron over all layers), mechanisms described herein can be used to detect and exploit temporal persistence across many levels of abstraction in visual data.

One characteristic that can be used to identify EvNets is that each neuron that has been implemented as an event neuron can be associated with state variables that provide the neuron long-term memory. For example, each event neuron, instead of re-computing from scratch for every new input, can be configured to accumulate information over time. This memory can facilitate EvNets performing robust inference over long video sequences that include significant camera motion while reducing computational costs (e.g., as described below in connection with FIG. 3, panels (b) and (c)).

In some embodiments, mechanisms described herein can be used to implement various structural components for EvNets, both at the individual neuron level (e.g., memory state variables) and at the network level (e.g., layers and transmission policies). As described below (e.g., in connection with FIGS. 6 and 9-14) such components can be used to modify virtually any conventional neural network into an EvNet. For example, as described below in connection with FIGS. 9-14, mechanisms described herein were used to implement EvNet versions of various state-of-the-art neural networks that perform several high-level and low-level tasks, such as: pose recognition, object detection, optical flow, and image enhancement. Modifying such networks using mechanisms described herein can cause order-of-magnitude reductions in arithmetic operations (e.g., between 2× and 20×, depending on the model), while maintaining high accuracy even under large camera motion.

In some embodiments, mechanisms described herein can be used with various hardware platforms and/or computation models, and the description below does not assume use of a particular hardware platform and/or computation model. Experimental results described below (e.g., in connection with FIGS. 9-14) are reported based on arithmetic and memory operations (a platform-invariant measure of computational cost) as opposed to wall-clock time, which depends on many situational variables (e.g., compiler, machine learning framework, and hardware platform).

Mainstream machine learning hardware platforms (e.g., graphics processing units (GPUs) and tensor processing units (TPUs)) are suited to block-wise computation and coarse-grained control. Event neural networks as described herein are not optimized for this computation model. In some embodiments, mechanisms described herein can be implemented with hardware that can implement each neuron to operate independently and asynchronously, facilitating massive parallelism and distributed computation. Note that mechanisms described herein do not necessarily directly compete with conventional neural networks on existing hardware. In some embodiments, neural networks implemented in accordance with mechanisms described herein can, if successful, lead to capabilities (e.g., high accuracy inference with extremely lightweight computations) that were hitherto considered impossible.

There have been many attempts to reduce the high computational cost of neural networks. For example, one approach attempts to build architectures that require fewer parameters and arithmetic operations. Another approach uses lower precision networks to achieve computation savings. Mechanisms described herein can be used to complement conventional architecture-based and/or precision-based efficiency techniques. Such conventional architecture-based and/or precision-based efficiency techniques reduce the cost of inference on a single time step, and EvNets can be used to reduce or eliminate repetitive computation between multiple time steps. As a more particular example, pruning techniques can be used to remove redundant neurons and/or synapses during training to improve efficiency. Instead of pruning universally redundant neurons as is done by pruning algorithms, an EvNet can be implemented to ignore temporally redundant neurons (e.g., neurons without significant changes over time) adaptively for each input, and an EvNet can update such a neuron as the input changes and the neuron starts changing. In some embodiments, on or more pruning techniques can be used to remove universally redundant neurons from a network (e.g., generating a pruned neural network), and mechanisms described herein can be used to implement the pruned neural network as an EvNet, which can provide further efficiency improvements.

Adaptive models attempt to modify computations that are being performed to suit the difficulty of each inference. Many adaptive model approaches include custom tailoring for each network architecture. In contrast, mechanisms described herein for modifying a neural network to implement an EvNet can be applied with virtually any network architecture and can be implemented without additional training (e.g., without retraining). Note that a network implemented as an EvNet can be trained (e.g., from scratch, via transferring learning techniques, etc.). Other adaptive models vary the input image size based on the instance difficulty. Such approaches are only useable with networks that have resizable inputs (e.g., images). Mechanisms described herein can be used as a general approach that can be used with any input type, including abstract feature vectors with no spatial dimensions. In some embodiments, on or more adaptive modeling techniques can be used to modify computations that are being performed to suit the difficulty of an inference, and mechanisms described herein can be used to implement the neural network as an EvNet, which can provide further efficiency improvements.

Conventional techniques that attempt to leverage repetition in videos often take a keyframe-based approach, computing expensive features on keyframes, and transforming these features to other frames. In general, such techniques require extensive modifications to each network architecture. Other techniques based on two-stream computation and video compression share this drawback. Skip-cony networks process values that have changed significantly between frames. However, the skip-cony algorithm is specific to convolutional layers and does not generalize to other layer types (e.g., fully-connected layers). Additionally, unlike EvNets described herein, skip-cony networks are not able to integrate long-term changes. This "forgetfulness" limits skip-cony networks to videos without camera motion and requires them to frequently re-initialize their state. As described below (e.g., in connection with FIGS. 9-14), a network implemented as an Event using mechanisms described herein can maintain high accuracy over hundreds of frames and can be effective on videos with significant camera motion.

Event sensors (e.g., as described in Lichtsteiner et al., "A 128×128 120 dB 15 ms latency asynchronous temporal contrast vision sensor," *IEEE Journal of Solid-State Circuits*, (2008)) generate sparse frames by computing a quantized temporal gradient at each pixel. Many networks configured to perform inferences on event data generated by such a device have efficient, sparse dynamics. However, such networks make strong assumptions about the mathematical properties of the network (e.g., that the network is piecewise linear). A network can be implemented as an EvNet using mechanisms described herein with few constraints on the model, and mechanisms described herein are compatible with a broad array of existing network architectures.

Many computer vision tasks, latency and power use are important factors that can impact performance of a computer vision system. For example, real time applications, such as mixed reality (MR), augmented reality (AR), virtual reality (VR), embodied perception, and autonomous navigation, computer vision tasks (e.g., image classification, scene measurement, etc.) may require low latency to operate successfully. Additionally, many real time applications may be performed by a power constrained system (e.g., a battery powered system). In many computer vision tasks, frame-based, floating-point inferences may incur unavoidable temporal delays and high energy costs, making such techniques ill-suited for resource-constrained real-time applications. For example, as deep learning applications have matured, new axes in the performance space have begun to emerge for new classes of applications (e.g., embodied perception, autonomous navigation, AR, MR, and VR) where latency and power consumption may be as important as accuracy. In such applications, it is important to consider not just overall accuracy, but a notion of streaming accuracy indicative of whether the computer vision task is performed with sufficient accuracy while adhering to a set of time and power constraints.

In some embodiments, mechanisms described herein can improve the efficiency of computer-vision tasks using techniques described herein to implement a neural network as an event neural network, which can reduce the number of computations performed at each time step, and reduce the amount of computational resources need to perform real-time computer vision tasks using video data.

Figure 1:
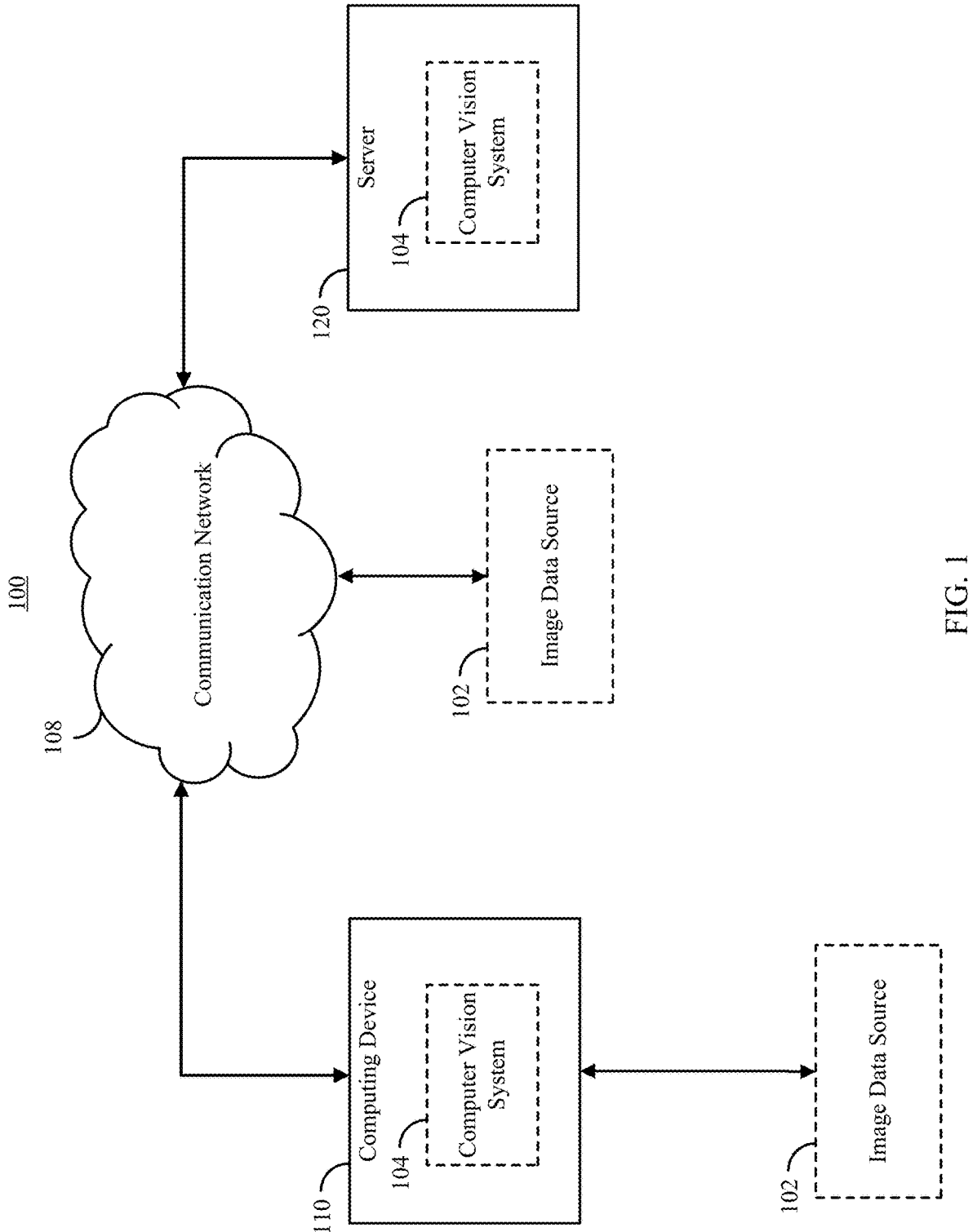
FIG. 1 shows an example of a system for generating and using neural networks having improved efficiency for analyzing video in accordance with some embodiments of the disclosed subject matter.

FIG. 1 shows an example 100 of a system for generating and using neural networks having improved efficiency for analyzing video in accordance with some embodiments of the disclosed subject matter. As shown in FIG. 1, a computing device 110 can receive image data from an image data source 102. In some embodiments, computing device 110 can execute at least a portion of a computer vision system 104 to perform a computer vision task, such as image classification, object detection, image segmentation, object tracking, optical flow, and/or any other suitable computer vision task.

In some embodiments, computing device 110 can execute at least a portion of a computer vision system 104 to use an ENN to perform a computer vision task with improved efficiency (e.g., with reduced latency, using reduced computational resources, and/or reduced power consumption).

Additionally or alternatively, in some embodiments, computing device 110 can communicate data received from image data source 102 to a server 120 over a communication network 108, which can execute at least a portion of computer vision system 104. In such embodiments, server 120 can return information to computing device 110 (and/or any other suitable computing device) indicative of an output of one or more ENNs used to implement computer vision system 104 to take an action based on an outcome of the computer vision task. In some embodiments, computer vision system 104 can execute one or more portions of process 700 described below in connection with FIG. 7.

In some embodiments, computing device 110 and/or server 120 can be any suitable computing device or combination of devices, such as a desktop computer, a laptop computer, a smartphone, a tablet computer, a wearable computer, a server computer, a virtual machine being executed by a physical computing device, etc.

In some embodiments, image data source 102 can be any suitable source of image data (e.g., video data) and/or other data that can be used to evaluate characteristics of a physical environment of image data source 102. For example, image data source 102 can one or more digital cameras that generate and/or output color image data, monochrome image data, image data representing light from one or more wavelengths outside the visible spectrum (e.g., infrared (IR), near infrared (NIR), ultraviolet (UV), x-ray, etc.), two-dimensional image data, three-dimensional image data, any other suitable image data, or any suitable combination thereof. In a more particular example, image data source 102 can include an imaging device configured to detect arrival of individual photons (e.g., using avalanche photodiodes), such imaging devices described in U.S. patent application Ser. No. 16/844,899, filed Apr. 9, 2020, and titled "Systems, methods, and media for high dynamic range quanta burst imaging." As another example, image data source 102 can be a light detection and ranging (LiDAR) device that generates and/or outputs data indicative of distance to one or more points in a physical environment of the LiDAR device (e.g., corresponding to one or more objects, surfaces, etc.).

As yet another example, image data source 102 can be any other suitable device that can produce asynchronous image data.

In some embodiments, image data source 102 can be local to computing device 110. For example, image data source 102 can be incorporated with computing device 110 (e.g., computing device 110 can be configured as part of a device for capturing and/or storing image data). As another example, image data source 102 can be connected to computing device 110 by a cable, a direct wireless link, etc. Additionally or alternatively, in some embodiments, image data source 102 can be located locally and/or remotely from computing device 110, and can communicate image data to computing device 110 (and/or server 120) via a communication network (e.g., communication network 108).

In some embodiments, communication network 108 can be any suitable communication network or combination of communication networks. For example, communication network 108 can include a Wi-Fi network (which can include one or more wireless routers, one or more switches, etc.), a peer-to-peer network (e.g., a Bluetooth network), a cellular network (e.g., a 3G network, a 4G network, a 5G network, etc., complying with any suitable standard, such as CDMA, GSM, LTE, LTE Advanced, NR, etc.), a wired network, etc. In some embodiments, communication network 108 can be a local area network, a wide area network, a public network (e.g., the Internet), a private or semi-private network (e.g., a corporate or university intranet), any other suitable type of network, or any suitable combination of networks. Communications links shown in FIG. 1 can each be any suitable communications link or combination of communications links, such as wired links, fiber optic links, Wi-Fi links, Bluetooth links, cellular links, etc.

Figure 2:
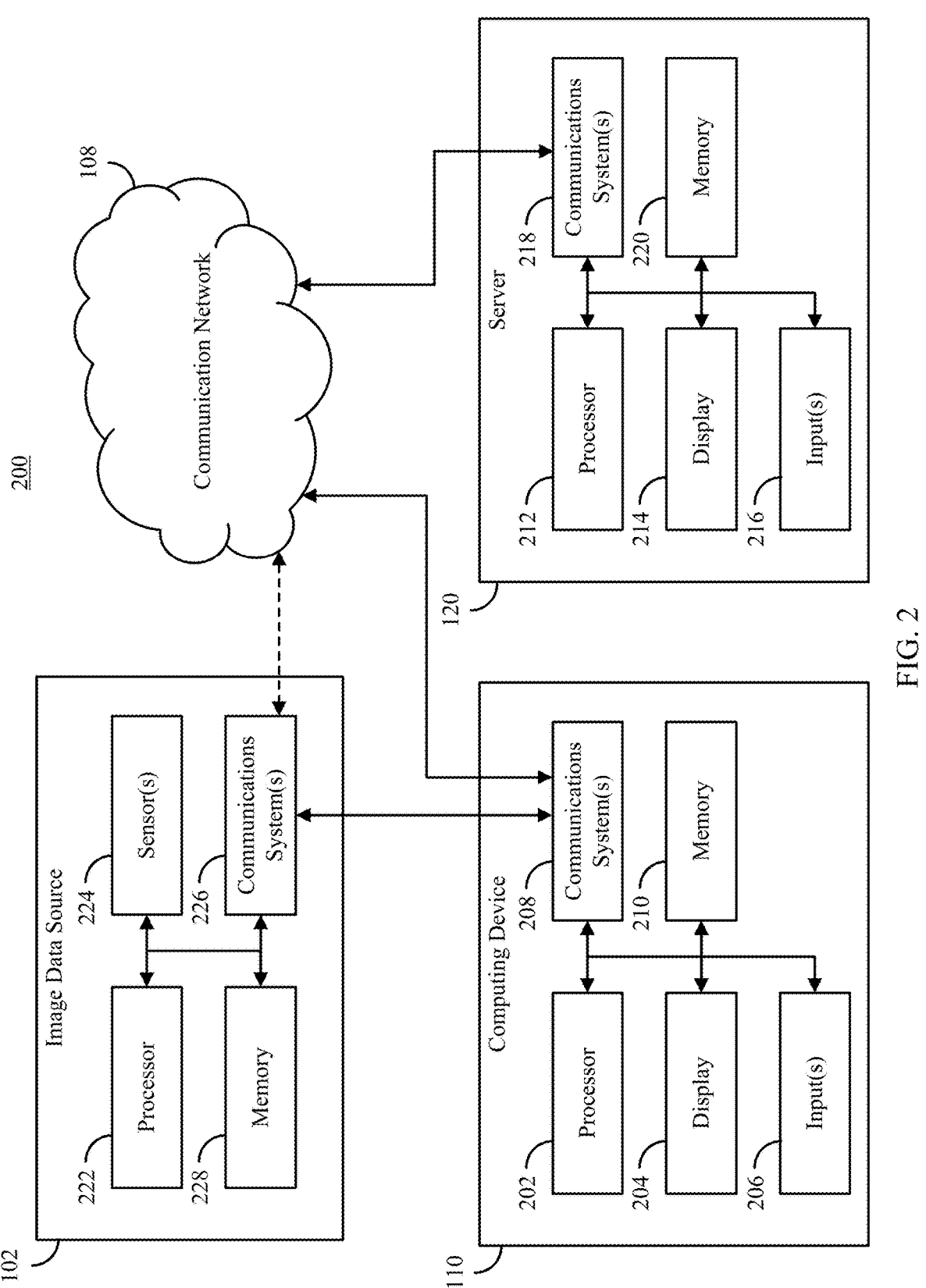
FIG. 2 shows an example of hardware that can be used to implement an image data source, a computing device, and a server, shown in FIG. 1 in accordance with some embodiments of the disclosed subject matter.

FIG. 2 shows an example 200 of hardware that can be used to implement image data source 102, computing device 110, and/or server 120 in accordance with some embodiments of the disclosed subject matter. As shown in FIG. 2, in some embodiments, computing device 110 can include a processor 202, a display 204, one or more inputs 206, one or more communication systems 208, and/or memory 210. In some embodiments, processor 202 can be any suitable hardware processor or combination of processors, such as a central processing unit (CPU), an application specific integrated circuit (ASIC), a field-programmable gate array (FPGA), a graphics processing unit (GPU), a tensor processing unit (TPU), etc. In a particular example, processor 202 can be a neuromorphic processor or neuromorphic processors configured to implement neurons for an ENN. In some embodiments, display 204 can include any suitable display devices, such as a computer monitor, a touchscreen, a television, etc. In some embodiments, inputs 206 can include any suitable input devices and/or sensors that can be used to receive user input, such as a keyboard, a mouse, a touchscreen, a microphone, etc.

In some embodiments, communications systems 208 can include any suitable hardware, firmware, and/or software for communicating information over communication network 108 and/or any other suitable communication networks. For example, communications systems 208 can include one or more transceivers, one or more communication chips and/or chip sets, etc. In a more particular example, communications systems 208 can include hardware, firmware and/or software that can be used to establish a Wi-Fi connection, a Bluetooth connection, a cellular connection, an Ethernet connection, etc.

In some embodiments, memory 210 can include any suitable storage device or devices that can be used to store instructions, values, etc., that can be used, for example, by processor 202 to perform a computer vision task, to present content using display 204, to communicate with server 120 via communications system(s) 208, etc. Memory 210 can include any suitable volatile memory, non-volatile memory, storage, or any suitable combination thereof. For example, memory 210 can include random access memory (RAM), read-only memory (ROM), electronically-erasable programmable read-only memory (EEPROM), one or more flash drives, one or more hard disks, one or more solid state drives, one or more optical drives, etc. In some embodiments, memory 210 can have encoded thereon a computer program for controlling operation of computing device 110. For example, in such embodiments, processor 202 can execute at least a portion of the computer program to use an ENN(s) in the performance of one or more computer vision tasks, present content (e.g., images, information about an object included in image data, information about distances to one or more points in a scene, etc.), receive information and/or content from server 120, transmit information to server 120, etc. As another example, processor 202 can execute at least a portion of the computer program to implement computer vision system 104. As yet another example, processor 202 can execute at least a portion of process 700 described below in connection with FIG. 7.

In some embodiments, server 120 can include a processor 212, a display 214, one or more inputs 216, one or more communications systems 218, and/or memory 220. In some embodiments, processor 212 can be any suitable hardware processor or combination of processors, such as a CPU, an ASIC, an FPGA, a GPU, a TPU, etc. In some embodiments, display 214 can include any suitable display devices, such as a computer monitor, a touchscreen, a television, etc. In some embodiments, inputs 216 can include any suitable input devices and/or sensors that can be used to receive user input, such as a keyboard, a mouse, a touchscreen, a microphone, etc.

In some embodiments, communications systems 218 can include any suitable hardware, firmware, and/or software for communicating information over communication network 108 and/or any other suitable communication networks. For example, communications systems 218 can include one or more transceivers, one or more communication chips and/or chip sets, etc. In a more particular example, communications systems 218 can include hardware, firmware and/or software that can be used to establish a Wi-Fi connection, a Bluetooth connection, a cellular connection, an Ethernet connection, etc.

In some embodiments, memory 220 can include any suitable storage device or devices that can be used to store instructions, values, etc., that can be used, for example, by processor 212 to present content using display 214, to communicate with one or more computing devices 110, etc. Memory 220 can include any suitable volatile memory, non-volatile memory, storage, or any suitable combination thereof. For example, memory 220 can include RAM, ROM, EEPROM, one or more flash drives, one or more hard disks, one or more solid state drives, one or more optical drives, etc. In some embodiments, memory 220 can have encoded thereon a server program for controlling operation of server 120. For example, in such embodiments, processor 212 can execute at least a portion of the server program to use an ENN(s) in the performance of one or more computer vision tasks, transmit content (e.g., images, information about an object included in image data, information about distances to one or more points in a scene, etc.) to a computing device (e.g., computing device 110), receive information and/or content from computing device 110, transmit information to computing device 110, etc. As another example, processor 212 can execute at least a portion of the computer program to implement computer vision system 104. As yet another example, processor 212 can execute at least a portion of process 700 described below in connection with FIG. 7.

In some embodiments, image data source 102 can include a processor 222, one or more sensors 224, one or more communications systems 226, and/or memory 228. In some embodiments, processor 222 can be any suitable hardware processor or combination of processors, such as a CPU, an ASIC, an FPGA, a TPU, etc. In some embodiments, sensor(s) 224 can be any suitable components to generate image data (e.g., video data) representing a portion of a scene. For example, sensor(s) 224 can include a CMOS sensor, a CCD sensor, an array of single-photon avalanche diodes (SPADs), an array of jots (e.g., as described in U.S. patent application Ser. No. 16/844,899), a LiDAR sensor, etc. Although not shown, image data source 102 can include one or more light sources (e.g., a LiDAR light source, a light source for structured light imaging, a modulated light source for continuous time-of-flight imaging, etc.).

Note that, although not shown, image data source 102 can include any suitable inputs and/or outputs. For example, image data source 102 can include input devices and/or sensors that can be used to receive user input, such as a keyboard, a mouse, a touchscreen, a microphone, a trackpad, a trackball, hardware buttons, software buttons, etc. As another example, image data source 102 can include any suitable display devices, such as a computer monitor, a touchscreen, a television, etc., one or more speakers, etc.

In some embodiments, communications systems 226 can include any suitable hardware, firmware, and/or software for communicating information to computing device 110 (and, in some embodiments, over communication network 108 and/or any other suitable communication networks). For example, communications systems 226 can include one or more transceivers, one or more communication chips and/or chip sets, etc. In a more particular example, communications systems 226 can include hardware, firmware and/or software that can be used to establish a wired connection using any suitable port and/or communication standard (e.g., VGA, DVI video, USB, RS-232, etc.), Wi-Fi connection, a Bluetooth connection, a cellular connection, an Ethernet connection, etc.

In some embodiments, memory 228 can include any suitable storage device or devices that can be used to store instructions, values, image data, etc., that can be used, for example, by processor 222 to: control sensor(s) 224, and/or receive outputs from sensor(s) 224; generate image data; present content (e.g., images, a user interface, etc.) using a display; communicate with one or more computing devices 110; etc. Memory 228 can include any suitable volatile memory, non-volatile memory, storage, or any suitable combination thereof. For example, memory 228 can include RAM, ROM, EEPROM, one or more flash drives, one or more hard disks, one or more solid state drives, one or more optical drives, etc. In some embodiments, memory 228 can have encoded thereon a program for controlling operation of image data source 102. For example, in such embodiments, processor 222 can execute at least a portion of the program to generate image data, transmit information and/or content (e.g., image data) to one or more computing devices 110, receive information and/or content from one or more computing devices 110, transmit information and/or content (e.g., image data) to one or more servers 120, receive information and/or content from one or more servers 120, receive instructions from one or more devices (e.g., a personal computer, a laptop computer, a tablet computer, a smartphone, etc.), etc. As another example, processor 222 can execute at least a portion of the program to implement computer vision system 104. As yet another example, processor 222 can execute at least a portion of process 600 described below in connection with FIG. 6.

Figure 3:
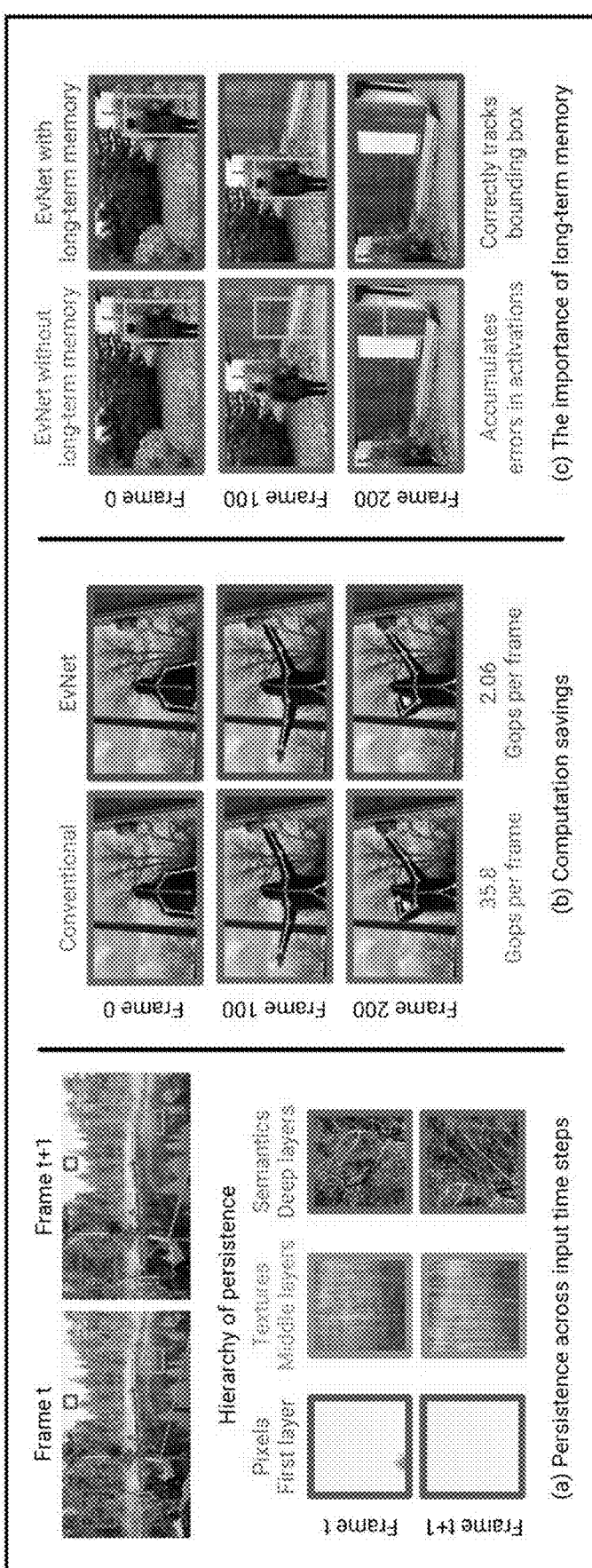
FIG. 3 shows examples illustrating persistence in video data, and improvements in the efficiency of, and/or results of, a computer-vision task using neural networks implemented in accordance with some embodiments of the disclosed subject matter.

FIG. 3 shows examples illustrating persistence in video data, and improvements in the efficiency of, and/or results of, a computer-vision task using neural networks implemented in accordance with some embodiments of the disclosed subject matter.

FIG. 3, panel (a), shows two frames from a video sequence separated by one second. Over this time, some areas of the image maintain consistent pixel values (e.g., the sky region). However, these areas only represent a small fraction of the frame. In other regions, the pixel values change, but other features, such as mid-level textures (e.g., vertical lines) and/or high-level semantics (e.g., tree branches) remain consistent. Each type of persistence can correspond to a different depth in a neural network hierarchy.

FIG. 3, panel (b), shows results generated by a neural network trained to perform pose recognition using a conventional architecture, and implemented using mechanisms described herein as an ENN. As shown in FIG. 3, panel (b), both neural networks generate similar pose information at frames 0, 100, and 200 of a video sequence. Event neural networks can leverage temporal persistence in video streams across multiple levels and yield significant computation savings while maintaining high accuracy. The conventional neural network required about 35.8 billion operations to make a pose inference for each frame (on average), while the same network implemented as an ENN required about 2.06 billion operations to make a pose inference for each frame (on average). Note that, as described below, the number of operations performed for each frame can be relatively consistent for the conventional network, while the number of calculations performed for each frame can substantially decrease for a time for the ENN.

FIG. 3, panel (c), shows results generated by a neural network trained to perform object detection using implemented using mechanisms described herein as an ENN without long-term memory, and with long-term memory. As shown in FIG. 3, panel (c), long-term memory can facilitate an ENN to perform robust inference even over long video sequences containing significant camera motion while significantly reducing the computation resources utilized to make an inference at each frame.

Figure 4:
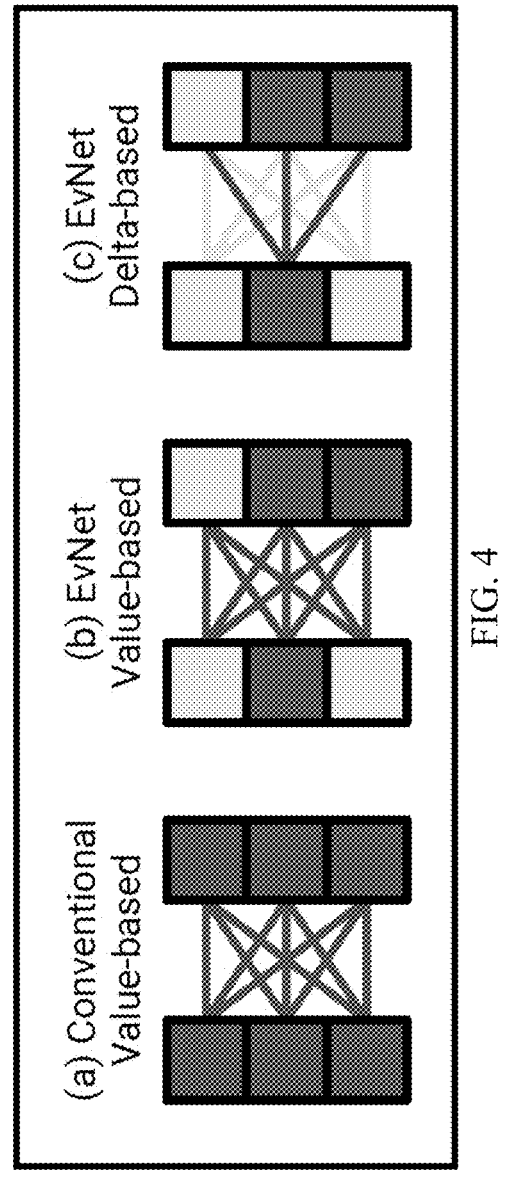
FIG. 4 shows examples of neuron transmission schemes, including a conventional value-based transmission scheme, a value-based neuron transmission scheme implemented in accordance with some embodiments of the disclosed subject matter, and a delta-based transmission scheme implemented in accordance with some embodiments of the disclosed subject matter.

FIG. 4 shows examples of neuron transmission schemes, including a conventional value-based transmission scheme, a value-based neuron transmission scheme implemented in accordance with some embodiments of the disclosed subject matter, and a delta-based transmission scheme implemented in accordance with some embodiments of the disclosed subject matter.

FIG. 4, panel (a) shows neurons in a conventional neural network, and which neurons perform a computation(s), and which neurons transmit an output(s) to a next layer. As shown in FIG. 4, panel (a), conventional neurons completely recompute their activations on each time step.

Consider a neuron in a conventional neural network. Let $x=[x_1, x_2, \ldots, x_n]$ be a vector of input values, and y be an output generated by the neuron. Suppose the neuron composes a linear function g (e.g., a convolution or fully-connected transform) with a nonlinear activation function $f$.

In such a neuron, the linear function g and the output y can be represented using the following relationships:

$$g(x) = \Sigma_{i=1}{}^{n} w_i x_i \qquad (1)$$

$$y = f(g(x)) \qquad (2)$$

where the vector $w = [w_1, w_2, \ldots, w_n]$ contains the weights of the function g. In a conventional network, every neuron recomputes both $f$ and g for every input frame, resulting in large computational costs over a video sequence.

FIG. 4, panel (b), shows neurons in an ENN that are configured with a value-based transmission scheme, and FIG. 4, panel (c), shows neurons in an ENN that are configured with a delta-based transmission scheme. The value-based event neurons of FIG. 4, panel (b), are configured to only transmit activations that have changed significantly. However, a value-based transmission can still trigger a potentially large number of downstream computations. The delta-based event neurons of FIG. 4, panel (c), are configured to only transmit differential updates to activations, resulting in considerable computational savings with respect to the value-based ENN neurons and the conventional neurons.

In some embodiments, mechanisms described herein can be used to implement a class of event neurons that can leverage temporal persistence in the activation of the neuron to achieve computation savings. Event neurons can have characteristics that can facilitate computational savings, such as sparse transmission, and delta-based transmission.

In a sparse transmission scheme, an event neuron can be configured to transmit its output to subsequent layers only when there is a sufficient change between its current activation and the previously transmitted value. FIG. 4, panel (b) shows transmissions based on an update policy that transmits an activation that sufficiently different than a previous activation. This property can reduce the quantity of updates that are sent to downstream neurons, which can lead to a reduction in computations. However, a value transmission can still trigger a large number of downstream computations that may be unnecessary. For example, suppose a given neuron receives an updated value along an input $x_i$, causing the neuron to recompute output y (e.g., to generate an output y') associated with that neuron. In such an example, the updated value of $x_i$ alone does not contain sufficient information to compute a new output y'. Computing y' requires re-reading all the elements of x and evaluating the product $w_i x_i$ for each. As shown in FIG. 4, panel (b), when a neuron in a first layer generates an updated output value that is transmitted to downstream neurons, downstream neurons also need outputs associated with other neurons in the first layer to calculate an updated output value for the downstream neurons.

In some embodiments, mechanisms described herein can be used to implement delta-based event neurons, which can further reduce the number of calculations that are performed in response to an updated upstream activation. In a delta-based event neuron, each neuron can transmit a differential value (e.g., in lieu of transmitting the value of its activation). This differential can encode a change from the neuron's previous output. For example, suppose a neuron receives a vector of incoming differentials $\Delta_{in}$ (e.g., with one element for each incoming synapse). In such an example, $\Delta_{in}$ can be sparse. As described above, neurons configured in accordance with some embodiments of the disclosed subject matter can be configured to transmit when a sufficient change has occurred, and to transmit a differential from a previous transmission. In a neural network that includes such neurons, $\Delta_{in}$ can include zeros at each position other than positions corresponding to values for upstream neurons that just transmitted a value (e.g., based on a significant change in the output of that neuron). The updated value of the linear function g can be computed as:

$$g(x + \Delta_{in}) = g(x) + g(\Delta_{in}). \qquad (3)$$

In some embodiments, a neuron implemented as a delta-based event neuron can store a value of g(x) in a state variable a, and can generate an updated value $g(x + \Delta_{in})$ based on a combination of the stored value and an output based on analysis of the new values (e.g., rather than calculating $g(x + \Delta_{in})$ from scratch).

In some embodiments, when a neuron receives a new input, the neuron can retrieve a stored value of g(x) from a, and can compute the new value $g(x) + g(\Delta_{in})$, and can save the result in state variable a. This can reduce the number of calculations associated with updating the neuron, as the neuron only needs to compute the product $w_i x_i$ for the nonzero elements of $\Delta_{in}$. As shown in FIG. 4, panel (c), by calculating values based on $\Delta_{in}$, downstream neurons can calculate updated values without requiring that the most recent outputs from an upstream layer can be transmitted and used to calculate the updated value. The savings in a delta-based approach can be significant. For example, in a pair of fully connected layers with N and M neurons, a single value-based transmission causes N×M multiplications. However, a delta-based transmission causes only M multiplications, one for each updated synapse.

In some embodiments, layers that include a non-linear activation function $f$ cannot be updated incrementally like a linear transform g. In such embodiments, whenever a changes for a delta-based event neuron, the activation function $f(a)$ can be computed, and the updated value of $f$ can be stored in another state variable associated with the neuron. Note that $f$ is often a simple, lightweight function (e.g., a ReLU), and the cost of recomputing $f$ is generally far smaller than the cost of computing the products $w_i x_i$.

Figure 5:
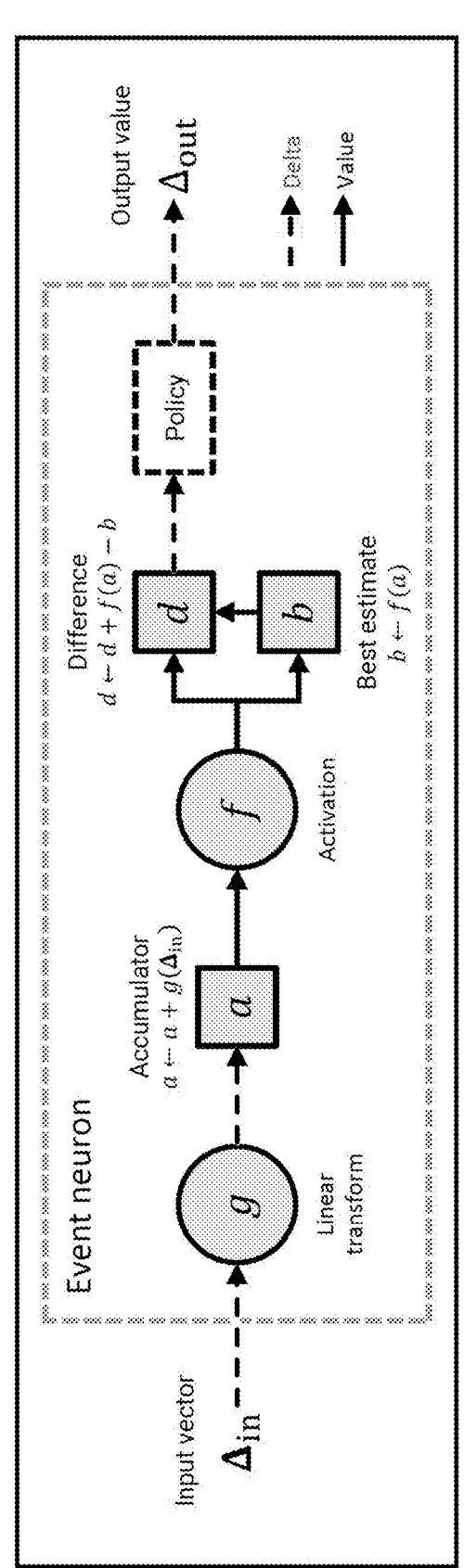
FIG. 5 shows an example of an event neuron with a delta-based neuron transmission scheme implemented in accordance with some embodiments of the disclosed subject matter.

FIG. 5 shows an example of an event neuron with a delta-based neuron transmission scheme implemented in accordance with some embodiments of the disclosed subject matter. As shown in FIG. 5, a delta-based event neuron can include various state variables (e.g., a, b, and d) and update rules, and shows that incremental updates to a can be converted from a delta-based representation to a value-based representation. In some embodiments, the subtraction $f(a) - b$ can be used to generate an output to a delta-based representation.

In some embodiments, an event neuron can include multiple state variables shown in FIG. 5. For example, an event neuron can include an accumulator state variable a, which can be used to store a most recently calculated value of g(x) (e.g., a value of g(x) calculated prior to receiving a new input $\Delta_{in}$). As another example, an event neuron can include a best estimate state variable b, which can be used to store a most recently calculated value of $f(a)$ (e.g., a value of $f(a)$ calculated prior to receiving a new input $\Delta_{in}$). As yet another example, an event neuron can include a difference state variable (d), which can store a difference between b and an output calculated based on an updated output (e.g., a difference between b and $f(a + g(\Delta_{in}))$).

In some embodiments, a neuron can receive a differential update $\Delta_{in}$ from one or more of its inputs (e.g., one or more upstream neurons), and the neuron can update one or more state variables in an order that reduces the occurrence of errors. For example, a neuron can update state variables a, b, and d in the following order:

$$a \leftarrow a + g(\Delta_{in}); \quad d \leftarrow d + f(a) - b; \quad b \leftarrow f(a) \qquad (4)$$

In such an example, the new value of a can be $a + g(\Delta_{in})$, $f(a)$ can be calculated for the new value of a, the new value of d can be $d + f(a) - b$, and the new value of b can be the new value of $f(a)$.

In some embodiments, a delta-based event neuron can be configured to transmit a value (e.g., forming an element of $\Delta_{in}$) when some condition on b and/or d is satisfied. For example, a transmission policy can define when a neuron is to transmit a value based on the new value of b and/or d (e.g., as described below in connection with FIG. 6). When the condition is satisfied, the neuron can transmit $\Delta_{out}$ (e.g., equal to the current value of d) to downstream neighbors, and the neuron can subtract the transmitted value from the state variable d. In a particular example, if the transmitted value is the same as the current value of the state variable d, the subtraction can reset $d \leftarrow 0$ (e.g., indicating that the current best estimate b is the same as the most recent update).

In some embodiments, state variable d can accumulate corrections to the neuron output that have not yet been transmitted. State variable d can represent long-term memory associated with a neuron, whereas state variable b can represent short-term memory of the neuron. In some embodiments, inclusion of long-term memory can prevent a neuron from discarding information when the neuron does not transmit. This can be characterized as an error retention property of the neuron, which can grant certain guarantees on the behavior of the neuron, as described below.

For example, an event neuron can receive a series of inputs $\Delta_n^{(1)}$, $\Delta^{(2)}$, ..., $\Delta_{in}^{(T)}$ over T time steps, and the state variables a, b, and d can have initial values $a^{(0)}$, $f(a^{(0)})$, and zero, respectively. In this example, the transmitted output values at each time step can be $\Delta_{out}^{(1)}$, $\Delta_{out}^{(2)}$, ..., $\Delta_{out}^{(T)}$ (some of which can be zero). By repeatedly applying neuron update rules, the neuron can arrive at the state:

$$a^{(T)} = a^{(0)} + g(\Sigma_{t=1}^{T} \Delta_{in}^{(t)}) \qquad (5)$$

$$d^{(T)} = f(a^{(T)}) - f(a^{(0)}) - \Sigma_{t=1}^{T} \Delta_{out}^{(t)}. \qquad (6)$$

As shown in EQ. (6), d is equal to the difference between the actual and transmitted changes in the activation. This is true regardless of the order or temporal distribution of the outputs Δ. As the neuron stores d, the neuron always has sufficient information to bring the transmitted activation into precise agreement with the current "correct" activation b. In some embodiments, this property can be used to bound the error within an EvNet. For example, each neuron's error can be bounded in a range [−h, +h] by transmitting whenever d exceeds those bounds.

Figure 6:
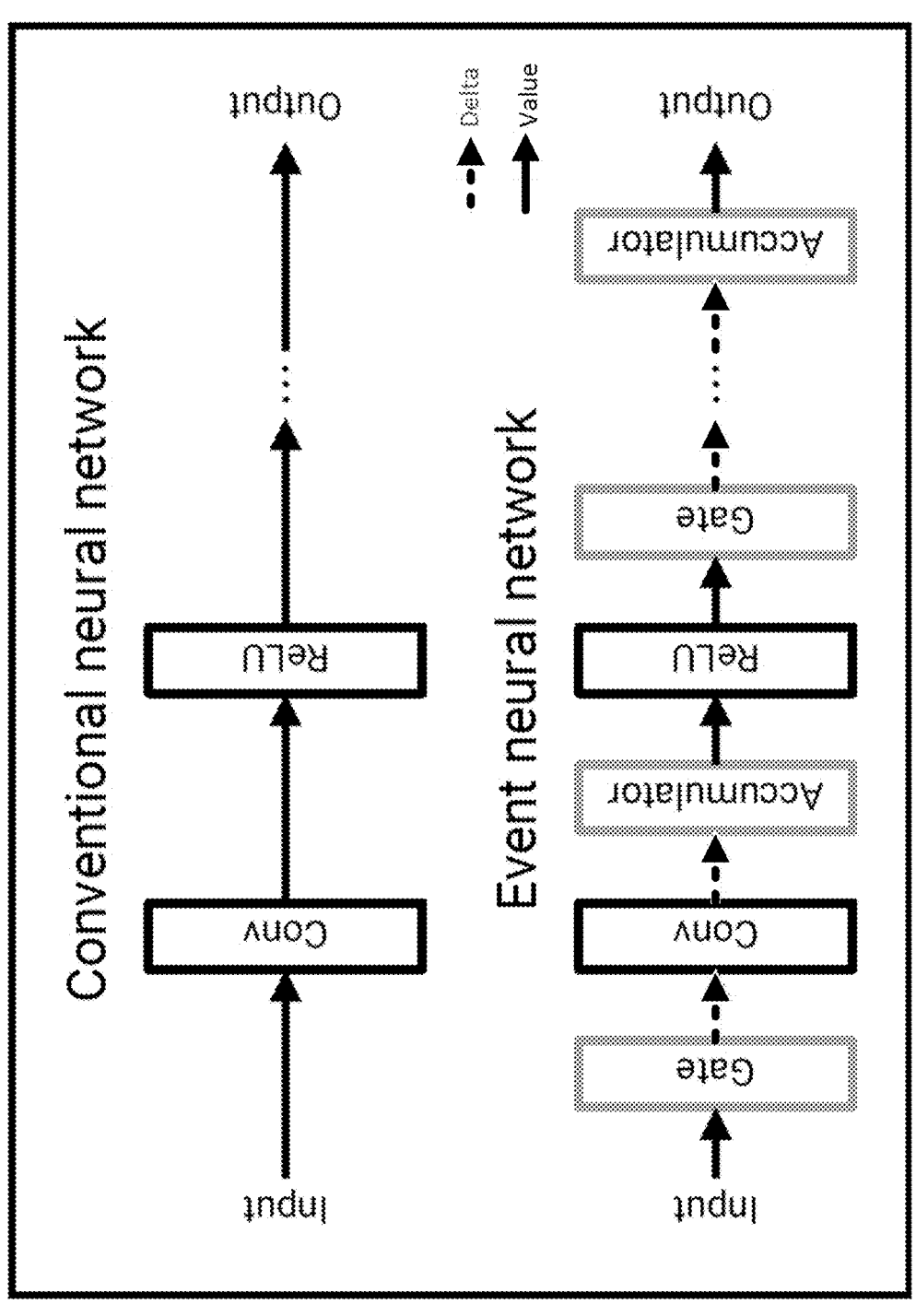
FIG. 6 shows an example of a portion of a conventional neural network and a modified neural network implemented

FIG. 6 shows an example of a portion of a conventional neural network and a modified neural network implemented as an event neural network in accordance with some embodiments of the disclosed subject matter. As shown in FIG. 6, accumulators and gates can be inserted into the architecture of a neural network, which can ensure that the input to linear layers (e.g., convolution layers, fully-connected layers, linear pooling layers, etc.) are delta-based, and that the input to nonlinear layers (e.g., ReLU activation layers, max pooling layers, etc.) is value-based.

The design and characteristics of individual event neurons were described above in connection with FIG. 5, and a broader perspective related to layers and networks is described in connection with FIG. 6. In general, a "layer" can be an atomic tensor operation (e.g., any atomic tensor operation, such as a convolution). Using such a definition of layer, the functions g and $f$ described above in connection with FIG. 4 can correspond to two different layers.

In some embodiments, mechanisms described herein can be used to implement various layers that can be used in an EvNet. For example, mechanisms described herein can be used to implement an accumulator layer configured to use a state tensor a (e.g., a tensor of any suitable rank based on the output of the input to the accumulator layer, such as a tensor of rank 1, a vector, a tensor of rank 2, a matrix, etc.) that includes values of state variable a associated with various neurons in the layer. As another example, mechanisms described herein can be used to implement a gate layer configured to use state tensors (e.g., vectors, matrices, etc.) b and d that include values of state variables b and d, respectively, associated with neurons in the layer. As still another example, mechanisms described herein can be used to implement a buffer layer configured to store inputs in a state tensor (e.g., vectors, matrices, etc.) x for future use by a subsequent layer. Such a buffer layer can facilitate non-pointwise, nonlinear layers (e.g., max pooling).

In some embodiments, state tensors (e.g., vectors, matrices, etc.) a, b, and/or d can be updated using expanded (e.g., vectorized) versions of the operations described above in connection with EQ. (4). For example, an accumulator layer can be configured to convert its input from delta-based to value-based. As another example, a gate layer can be configured to convert from value-based to delta-based. In some embodiments, gates can be configured to restrict the flow of updates through the network by applying a transmission policy (e.g., as described below).

In some embodiments, mechanisms described herein can create an EvNet via insertion of gates and accumulators into a pretrained network such that linear layers receive delta-based inputs and nonlinear layers receive value-based inputs, as shown in FIG. 6.

Additionally, in some embodiments, mechanisms described herein can place a gate at the beginning of the network and an accumulator at the end. For example, the input gate (e.g., a gate layer that receives input data from a data source) can use input values (e.g., pixel values) instead of $f(a)$, and can update b (e.g., a received pixel value, a value derived from the input value to be compatible with the neural network, etc.) and d (e.g., a difference between a current value of b and a previous value of b) at every timestep.

In some embodiments, an input gate (and/or one or more associated components) can generate a value that is suitable for use by the neural network. For example, the input gate can aggregate a predetermined number of inputs (e.g., based on a difference in a count of photon detections from a SPAD-based, or other single photon detector-based, sensor over a predetermined period of time, and a count in a previous predetermined time).

As another example, the output accumulator can update a sparsely, but can read all the elements at every time step (e.g., every frame of video data). Throughout the model, the functions computed by the preexisting layers (the $f$ and g) can remain unchanged, and can, so it is not necessary to re-train the network.

In some embodiments, a processor (e.g., processor 202, processor 212, processor 222, etc.) can be programmed to perform a process (e.g., without user intervention) that includes inserting gates and accumulators into a pretrained (e.g., as described below in connection with FIG. 7).

Note that mechanisms described herein can be used to convert an entire network to an EvNet, and can also be used to convert one or more isolated portions of a network into an EvNet. For example, FIG. 6 illustrates the conversion of an entire (very simple) network. As another example, in an experiment performed on HDRNet (e.g., as described in Gharbi et al., "Deep bilateral learning for real-time image enhancement," ACM Transactions on Graphics, (2017)), one of the HDRNet subnetworks (the guidemap network) was excluded from conversion to an EvNet to avoid reducing the output quality.

In some embodiments, update rules described above in connection with FIG. 5 can define how a system executing an EvNet updates the neuron state variables associated with each neuron that has been converted to operate as an event neuron, but the rules do not specify the initial values of the state variables. Mechanisms described herein can be used with different initialization strategies. For example, consider a simple initialization strategy where the initial values of a and d are set to zero for all neurons (e.g., a=0 and d=0 for all event neurons). Note that since the activation function $f$ is nonlinear, the value of the state variable $b=f(a)$ may be nonzero. In general, this nonzero b translates to a nonzero value of a in the next layer. Accordingly, initializing all neurons to a=0 can create inconsistencies.

In some embodiments, mechanisms described herein can be configured to constrain initial values of state variables to maintain internal consistency. For example, consider a neuron associated with state variables a, d, and b. Let $b_{in}$ and $d_{in}$ be vectors (or tensors of any suitable rank) containing the states of the neurons in the previous layer. A network can be considered internally consistent state if, for all neurons, $$a=g(b_{in}-d_{in}), \text{ and} \tag{7}$$

$$b=f(a). \tag{8}$$

In some embodiments, mechanisms described herein can use any suitable technique to satisfy criteria represented in EQS. (7) and (8). For example, one relatively simple technique to satisfy these criteria is to flush some canonical input through the network. Starting with neurons in the first layer and progressively moving through all subsequent layers, the values of state variables a, b, and d can be set using as follows:

$$a=g(b_{in}); \ b=f(a); \ d=0. \tag{9}$$

In experiments described below in connection with FIGS. 9-14, the canonical input used to initialize the state variables was the first input data (e.g., a first frame of video data).

In some embodiments, mechanisms described herein can use a transmission policy to determine when to transmit values (e.g., delta values) to one or more neurons in a next layer. A transmission policy can be defined as a function P:d→m that maps the tensor d for a particular layer to a binary mask m that is indicative of which neurons should transmit.

In some embodiments, transmission policies can be selected with a particular level of locality and granularity. The definition of transmission policy described above (e.g., P:d→m) permits different levels of locality, which can be characterized based on the number of elements from d required to compute each element of m. For example, a global policy can consider all elements of d when computing each $m_i$. As a more particular example, a global policy can be configured to transmit the n largest d-values in a layer at a particular time step. As another example, a local policy can consider some subset of d (e.g., with size >1) when computing each element of m. As a more particular example, Gumbel gates (e.g., as described in Habibian et al., "Skip-convolutions for efficient video processing," in Proceedings of the IEEE/CVF Conference on Computer Vision and Pattern Recognition (2021)) can be used to implement a local transmission policy. As another example, thresholds can be applied to spatially pooled d to implement a local transmission policy. As yet another example, an isolated policy can consider only the element $d_i$ when computing $m_i$ (e.g., determining whether $d_i$ satisfies a threshold).

In addition to the locality of a transmission policy, the definition of transmission policy described above (e.g., P:d→m) permits different levels of granularity, which can be characterized based on how outputs are tied together. For example, groups of neurons can be constrained to have the same value of m. As a more particular example, a chunked policy can tie neurons together into local groups, producing one value of m for each group. As another more particular example, a singular policy can individually assign each neuron a value of m.

In some embodiments, mechanisms described herein can use a linear-cost policy, which can be characterized as an isolated, singular policy based on a threshold. Such a policy can be represented using the relationship:

$$m_i=H(|d_i|-h_i), \tag{10}$$

where H is the Heaviside step function and $h_i$ is the threshold for neuron i. An advantage of this policy is the relatively low overhead caused by the policy. For example, in response to receiving an incoming transmission, a system executing an EvNet using the policy can evaluate whether |d|>h (one subtraction) for neuron i, in addition to the updates to a, d, and b. Neurons not receiving any updates (e.g., neurons in a static image region) do not incur any overhead using such a transmission policy. The cost of the policy is linear in the number of updated neurons. Combined with the linear cost of computing the neuron updates described above in connection with EQ. (4), utilizing a linear-cost policy can results in a network with an overall cost that is linear in the number of updates. The cost of such a network scales with the amount of change in its inputs, not with the quantity of data it receives. This linear cost can have significant implications for networks processing rapid, sparse updates. For example, consider a high-speed camera operating at 10,000 frames per second. The differences between adjacent frames may be minuscule, leading to a sparse set of network updates on each frame. In such an example, the cost of computing a policy with a fixed per-frame overhead (e.g., utilizing a Gumbel gate) can grow to dominate the runtime computing costs associated with the network. In contrast, a linear-cost policy can give a fixed ratio between the policy and update costs.

Similar situations can arise with event sensors and single-photon sensors. For example, such sensors can operate both at extremely high frame rates (e.g., 100,000 FPS) or in an asynchronous, "free-running" mode in which a sensor records each photon as a separate event. EvNets with a linear-overhead transmission policy provide a natural solution for processing such data. Each input photon can be consumed immediately by the network, triggering a sparse set of updates and a proportionally sparse set of policy computations.

With a chunked policy, neurons within a neighborhood can be configured to wait until some agreed-upon time (e.g., a predetermined time step), and can then simultaneously compute m and transmit according to the value of m. In contrast, a singular policy allows each neuron to operate independently from other neurons in the same layer. However, there are situations where grouping neurons into "bundles" may be practically desirable. For example, current GPU hardware can compute in 32-thread warps. In this case, a 32-neuron, chunked granularity may better leverage the available thread-level parallelism provided by a GPU than a singular policy, which may result in superior performance. The nature of the input data may impact whether a singular policy executed by a CPU or a chunked policy executed by a GPU provides superior performance. For example, if events are relatively asynchronous (e.g., changes are not necessarily aligned with a particular frame) and/or the input changes relatively slowly (e.g., events are relatively sparse), a CPU executing a singular policy may outperform a GPU executing a chunked policy (e.g., based on the total number of operations performed, based on the power used to perform the operations, based on the time taken to generate an output, etc.). As another example, if events are synchronous (e.g., processed in frames) and/or the input changes relatively often (e.g., events are relatively dense), a GPU executing a chunked policy may outperform a CPU executing a singular policy (e.g., based on the power used to perform the operations, based on the time taken to generate an output, etc.).

Note that the transmission policies analyzed herein represent a small sample of the available design space of transmission policies. For example, a transmission policy can incorporate a stochastic firing strategy (e.g., treating |d| as a firing probability). As another example, a firing threshold (e.g., $h_i$) can be used a trainable parameter of an EvNet. Although a relatively simple linear-cost policy has many desirable properties, it may be sub-optimal in terms of its efficiency-accuracy trade-off in some situations.

FIG. 7 shows an example of a process 700 for generating and using an even neural network with improved efficiency to analyze image data in accordance with some embodiments of the disclosed subject matter.

As shown in FIG. 7, at 702, process 700 can receive a pre-trained neural network and/or can train a neural network. In some embodiments, the neural network can be any suitable type of neural network, such as a convolutional neural network (CNN), a fully connected network, an autoencoder, or any other suitable type of neural network. Additionally, although mechanisms described herein are generally described in connection with networks that are trained to perform a machine vision task or a task related to machine vision (e.g., tasked described below in connection with FIGS. 9-14), mechanisms described herein can be used to convert a neural network trained to perform another type of task to an EvNet.

In some embodiments, process 700 can use any suitable technique or combination of techniques to train the neural network. For example, process 700 can train a neural network using techniques described in connection with 502-510 in U.S. patent application Ser. No. 17/246,219, filed Apr. 30, 2021. As another example, process 700 can train a neural network using techniques described in Cao et al., "Realtime multi-person 2D pose estimation using part affinity fields," in Proceedings of the IEEE Conference on Computer Vision and Pattern Recognition (2017); in Redmon et al., "You only look once: Unified, real-time object detection," in Conference on Computer Vision and Pattern Recognition (CVPR) (2016); Gharbi et al., "Deep bilateral learning for real-time image enhancement," ACM Transactions on Graphics, (2017); Sun et al., "PWC-Net: CNNs for optical flow using pyramid, warping, and cost volume," in Proceedings of the IEEE Conference on Computer Vision and Pattern Recognition (2018); and/or using any other suitable technique or combination of techniques.

At 704, process 700 can modify a network architecture of the trained neural network using components that implement memory and/or a transmission policy of an event neural network (ENN). In some embodiments, process 700 can use any suitable technique or combination of techniques to modify the network architecture of the trained neural network. For example, process 700 can add, to one or more individual neurons, an accumulator state variable a to a neuron (e.g., by associating the neuron with a portion of memory used to store state variable a), a best estimate state variable b (e.g., by associating the neuron with a portion of memory used to store state variable b), and/or a difference state variable d to a neuron (e.g., by associating the neuron with a portion of memory used to store state variable d). As another example, process 700 can implement a transmission policy, and can associate with the transmission policy with one or more individual neurons (e.g., by associating the transmission policy with identifying information of neurons to which the transmission policy is to be applied).

As yet another example, process 700 can add, in connection with one or more layers, an accumulator layer associated with an accumulator state tensor (e.g., vector, matrix, etc.) a (by associating the neurons of a layer with a portion of memory used to store state tensor a). As still another example, process 700 can add, in connection with one or more layers, a gate layer associated with a best estimate state vector b, and/or a difference state variable d (e.g., by associating the neurons of a layer with a portion of memory used to store state tensor b and d).

In some embodiments, process 700 can modify all neurons and/or all layers in the trained neural network using state variables a, b, and/or d, and/or state tensors (e.g., vectors, matrices, etc.) a, b, and/or d. Additionally or alternatively, process 700 can modify a subset of neurons and/or a subset of layers in the trained neural network using state variables a, b, and/or d, and/or state tensors a, b, and/or d. In some embodiments, process 700 can receive input (e.g., provided via a user input device, such as input 206 and/or input 216, via a communication system, such as communication system 208 and/or communication system 218, and/or from any other suitable source).

At 706, process 700 can receive image data from a data source. For example, process 700 can receive one or more frames of video data from an image sensor and/or from a camera incorporating an image sensor. In such an example, the frame(s) of video data can include two dimensional image data (e.g., each pixel can be associated with an intensity value and/or information indicative of a color(s) associated with the pixel). Additionally or alternatively, in some embodiments, the frame(s) of video data can include depth information associated with portions of the scene. As another example, process 700 can receive one or more data points associated with a point in a scene (e.g., one or more photon detections by a single photon sensor such as a single photon avalanche diode (SPAD), a jot, etc.; one or more events indicative of a change in a scene output by an event camera; etc.). As yet another example, process 700 can receive one or more data points associated In some embodiments, process 700 can be executed, at least in part, by a processor of a data source. For example, process 700 can be executed by a device that includes an image sensor, such as a smartphone, a tablet computer, a laptop computer, a security camera, a vehicle with one or more integrated image sensors and/or other sensors (e.g., sonar, radar, lidar, etc.), etc. Additionally or alternatively, in some embodiments, process 700 can be executed, at least in part, by a processor of a device that receives data from one or more data sources. For example, process 700 can be executed by a device, such as a server, a vehicle control system, etc., that receives data from a device that incorporates an image sensor (e.g., via a network, via a peer to peer wireless connection, via a wired connection, etc.).

Note that although process 700 is generally described in connection with receiving image data (e.g., video data; asynchronous image data such as image data from a SPAD-based (or other single photon detector-based) sensor and/or event camera; depth image data; medical imaging data such as ultrasound, medical resonance imaging (MRI), etc.; etc.), this is an example, and process 700 can be used in connection with other time-varying data (e.g., multidimensional data). For example, process 700 can be used in connection with depth data (e.g., data generated by a lidar, data generated by a radar system, data generated by a sonar system, data generated by a depth camera such as an RGBD sensor, etc.), which may or may not be associated with color data, and which can be arranged in any suitable format (e.g., a matrix corresponding to sensor position in two or more dimensions, a point cloud, etc.). As another example, process 700 can be used in connection with audio data (e.g., speech recorded using a microphone). As yet another example, process 700 can be used in connection with rendering content, such as neural rendering techniques that can involve scanning a neural network over locations in a rendered scene to synthesize views of the scene for different viewing directions (e.g., as described in Mildenhall et al., "NeRF: Representing Scenes as Neural Radiance Fields for View Synthesis," available at arxiv(dot)org/pdf/2003.08934 (dot)pdf (2020)).

At 708, process 700 can provide at least a portion of image data (and/or other data) received at 706 to the ENN. For example, process 700 can provide a frame of image data (e.g., generated from video data) to the ENN. As another example, process 700 can provide data that includes counts of photon detections by SPAD-based pixels (and/or other single-photon detector-based pixels) over a predetermined period of time.

At 710, process 700 can cause updates to be propagated through the ENN based on the provided image data. For example, as described above in connection with FIGS. 5 and 6, process 700 can utilize update rules (e.g., described above in connection with EQ. (4)) and a transmission policy (e.g., as described above in connection with FIG. 6) to propagate updates based on the input through the ENN.

At 712, process 700 can receive an output(s) from the ENN corresponding to a prediction based on the data received at 706. For example, the output can be any suitable data, such as a prediction based on the input at a particular time step. In a more particular example, the prediction can correspond to a transformed version of the input data (e.g., a high dynamic range image, a deblurred image, etc.). As another more particular example, the prediction can correspond to data indicative of a location (e.g., a two dimensional location, a three dimensional location). As yet another more particular example, more particular example, the prediction can correspond to a label(s) associated with an object in a scene (e.g., a person, a car, an animal, etc.). As still another more particular example, the prediction can correspond to data indicative of a pose of a person. As a further more particular example, the prediction can correspond to data indicative of motion of at least a portion of a scene (e.g., optical flow data). As a yet further more particular example, the prediction can correspond to another any suitable combination of data (e.g., a location of an object within the scene in two or three dimensions, and a label associated with the object). In some embodiments, the output can be formatted in the format provided by the trained neural network prior to modification as an ENN.

At 714, process 700 can present content based on an output(s) of the ENN and/or can perform a computer vision task based on a current output of the ENN. For example, process 700 can present an image generated by the ENN (e.g., using display 204, using display 214), and/or can cause another device to present the image. In a more particular example, process 700 can present a high dynamic range image generated by the ENN, and/or can cause the high dynamic range image to be presented. In another more particular example, process 700 can present a modified image (e.g., modified to add a filter effect to the image, such as a filter to change the appearance of an object in the image), and/or can cause the high dynamic range image to be presented.

As another example, process 700 can present an image with one or more annotations generated by the ENN (e.g., using display 204, using display 214), and/or can cause the annotated image to be presented. In a more particular example, process 700 can present an image with labels associated with one or more objects in a scene, and/or can cause the annotated image to be presented.

As yet another example, process 700 can perform a computer vision task based on a current output of the ENN. In a more particular example, process 700 can use object detection information output by the ENN to determine the location of one or more objects in a physical environment of a device executing process 700. As another more particular example, process 700 can use pose information output by the ENN to control a user interface based on the pose. As yet another more particular example, process 700 can use pose information output by the ENN to map the detected pose to a virtual avatar used to represent a subject for which pose information was generated. As still another more particular example, process 700 can use pose information output by the ENN to inform image editing (e.g., photo or video editing) used to apply spatial or color transformations to one or more subject in an image(s) (e.g., to add a filter effect).

In some embodiments, process 700 can return to 706 and/or 708, and can receive additional image data and/or provide additional image data to the ENN.

FIG. 8 shows an example of errors that can accumulate due to lack of sufficient long-term memory in an event neural network in accordance with some embodiments of the disclosed subject matter. The results in FIG. 8 compare an ENN trained to perform pose estimation that uses state variables a, b, and d, and an ENN implemented without using state variable d.

In FIG. 8, the effect of ablating the long-term memory d is shown (implemented by resetting d to zero after each input). The model used to generate the data in FIG. 8 is based on the OpenPose model described in Cao et al., "Realtime multi-person 2D pose estimation using part affinity fields," in Proceedings of the IEEE Conference on Computer Vision and Pattern Recognition (2017) using images from the autolabelled MPII dataset described in Andriluka et al., "2D human pose estimation: New benchmark and state of the art analysis," in Proceedings of the IEEE Conference on Computer Vision and Pattern Recognition (2014). Other than resetting d, the two models shown are identical (including using the same thresholds). As shown in FIG. 8, the long-term memory d is critical for maintaining stable accuracy, as ablating state variable d causes a rapid decay in accuracy. The y-axis shows agreement between the conventional version of a pose recognition model (i.e., prior to conversion to an ENN), and ENN versions of the pose recognition model with and without state variable d. In the version without state variable d, the neurons compute the difference between state variable b on adjacent time steps, and then transmit or discard the difference, without storing the remainder. Under this model, the final state of the neuron depends strongly on the order and temporal distribution of inputs.

For example, the neuron can be configured to transmit if the frame-to-frame difference in b exceeds a threshold δ. Consider a scenario A where the neuron's activation jumps from 0 to 2δ. Because 2δ>δ, the neuron transmits the change 2δ and ends in a state of zero error. Now, consider another scenario B, where the neuron's activation gradually increases from 0 to 2δ in steps 0.1 δ, 0.2δ, . . . , δ. Gradual changes like this are common in practice (e.g., when panning over a surface with an intensity gradient). Now, because 0.1 δ<δ, the neuron never transmits and ends in a state with error −2δ. Additionally, because the neuron discards non-transmitted activations, it has no way to determine that it is, in fact, in a state with error −2δ. This error is unknowingly carried into all of its future computations.

As shown in FIG. 8, without a means of accumulating non-transmitted errors, the accuracy decays rapidly. Additionally, FIG. 3, panel (c) shows an example result for bounding box detection with and without state variable d. The frame-to-frame model on the left fails to correctly track the bounding box. Note that although the bounding box does not move, this model still computes over a billion operations per frame.

FIG. 9 shows examples of efficiency improvements that can be realized using mechanisms described herein to modify existing neural networks that perform different computer vision tasks in accordance with some embodiments of the disclosed subject matter based on video data with various levels of camera motion.

In FIG. 9 results shown were generated from four different neural networks converted to ENNs with significant variations in architecture. Performance of two high-level tasks and two low-level tasks were evaluated: high-level pose recognition and object detection tasks, and low-level image enhancement and optical flow tasks. For all models, the number of multiply-accumulate (MAC) operations are presented as a measure of computational costs. Some models include specialized transforms (e.g., the bilateral transform for HDRNet). These transforms represent a small portion of the overall computational cost of the models, and such specialized transforms are excluded when counting MAC operations. Because these transforms are not generally linear, accumulator layers were inserted before those operations, and gate layers were inserted following the operations.

For evaluating EvNet performance on the pose recognition task, the OpenPose model was used for single-frame, multi-person pose estimation. The original pretrained weights (trained on the MPII dataset) and a global threshold of h=0.05 for the transmission policy. The models were evaluated using the PCKh benchmark (described in Andriluka et al., "2D human pose estimation: New benchmark and state of the art analysis," in Proceedings of the IEEE Conference on Computer Vision and Pattern Recognition (2014)) when head annotations were available, and using the PCK benchmark described in Yang et al., "Articulated human detection with flexible mixtures of parts," IEEE Transactions on Pattern Analysis and Machine Intelligence (2013) with α=0.2 otherwise.

For evaluating EvNet performance on the object detection task, the YOLOv3 model (described in Redmon et al., "You only look once: Unified, real-time object detection," in Conference on Computer Vision and Pattern Recognition (CVPR) (2016)) was used for multi-object detection. The pretrained MS-COCO weights provided by Redmon et al. were used to evaluate on the mAP-50 metric (e.g., as described in Everingham et al., "The Pascal Visual Object Classes (VOC) challenge," International Journal of Computer Vision (2010), and Padilla et al., "A comparative analysis of object detection metrics with a companion open-source toolkit," Electronicsweek, (2021)). YOLO includes a batch normalization transform after each linear layer; and the y associated with each batch normalization was used to scale the policy thresholds to better match the activation distribution of each channel. More particularly, the thresholds for the transmission policy were set to $$h = \frac{0.06}{\gamma}.$$

For evaluating EvNet performance on the image enhancement task the Local Laplacian version of HDRNet (e.g., as described in Paris et al., "Local Laplacian Filters: Edge-aware image processing with a Laplacian pyramid," ACM Transactions on Graphics (2011)) was used for image enhancement. HDRNet has two subnetworks: a deep, low-resolution feature network and a shallow, high-resolution guidemap network. The guidemap network represents about 90% of the overall operations, and converting it to an EvNet has a noticeable effect on the visual quality of the output. Therefore, only the feature network was converted to an EvNet. Operation counts are shown for both the overall model (both subnetworks) and the feature network (the EvNet portion). These operation counts are referred to as "HDRNet-a" and HDRNet-f," respectively. A threshold of h=0.1 was used, and performance was evaluated using peak signal-to-noise ratio (PSNR).

For evaluating EvNet performance on the optical flow task, the PWC-Net model (as described in Sun et al., "PWC-Net: CNNs for optical flow using pyramid, warping, and cost volume," in Proceedings of the IEEE Conference on Computer Vision and Pattern Recognition (2018)) was used for optical flow computation. Unlike the models above which take a single frame as input, the PWC-Net model takes a pair of frames. A threshold of h=0.01 was used, and performance was evaluated using the EPE metric described in Baker, et al., "A database and evaluation methodology for optical flow," *International Journal of Computer Vision* (2011).

Large-scale EvNet evaluation is challenging, for at least two reasons. For example, the datasets used for training the models used for evaluation (e.g., MS-COCO) are usually single-frame. However, these single-frame inputs are not as useful for evaluating performance of EvNets on analysis of long video sequences. As another example, another important component of the analysis described herein is the extent to which camera motion in a video effects the performance of an EvNet. As there were no known large-scale machine learning datasets containing camera motion labels, a custom dataset derived from MPII was generated to evaluate performance of mechanisms described herein. A subset of MPII videos (the first 246) having a uniform length (exactly 41 frames) were selected, and each video was labeled as having "no camera motion" (perfectly stationary camera), "minor camera motion" (slight camera shake), or "major camera motion." These splits include 59, 46, and 141 videos, respectively. Synthetic labels were generated by passing video frames through the conventional version of each model and taking the output as ground truth. Task-specific metrics were then used to measure the agreement between the conventional and EvNet outputs on the video data with various levels of motion. Frames were resized to 288×512 pixels for OpenPose, YOLO, and PWC-Net, and resized to 540×960 pixels for HDRNet.

In FIG. 9 computation savings for various levels of camera motion are presented as a multiplier between the computations performed by EvNet version of the network compared to the conventional form of the network. For example, for the OpenPose network, the conventional version performed 17.3 times as many calculations to generate results on the 41 frames of video than were performed by the EvNet version of the OpenPose network (which can be referred to herein as a 17.3 times reduction in computations).

As shown in FIG. 9, large computation savings (e.g., on the order of a 5× to 20× reduction in MAC operations) are achieved when there is no motion. However, significant savings are also achieved when there is large motion (e.g., on the order of 2× to 9× reduction in MAC operations). "HDRNet-a" represents the whole model, including the guidemap subnetwork, and "HDRNet-f" represents only the feature subnetwork.

FIG. 10 shows examples of efficiency improvements that can be realized using mechanisms described herein to modify existing neural networks, metrics indicative of performance of the network with modifications in accordance with some embodiments of the disclosed subject matter, and overhead attributable to modifications associated with modifying the networks as event neural networks. The overall savings, agreement between conventional and ENN models, and overhead percentage (based on the number of extra operations expended for each operation saved). Operation savings are shown as "arithmetic overhead"/"memory overhead".

As shown in FIG. 10, the metric values indicate strong agreement. This is consistent with qualitative experiments (e.g., as described below in connection with FIG. 12), where the ENN predictions are nearly identical to the conventional predictions.

The overhead percentages represent the number of extra arithmetic and memory operations as a fraction of the computational savings. For example, an arithmetic overhead ratio of 5% indicates that one extra operation is computed by the neuron for every 20 operations that are saved by implementing the neuron in an ENN using techniques described herein, rather than in a conventional neural network. Overhead is calculated as follows. An update to an accumulator requires one load (of state variable a), one addition (a+g(Δ)), and one store (of a). An update to a gate requires two loads (of state variables b and d), three additions (d+ƒ(a)−b and |d|−h), and two stores (of state variables b and d). A transmission requires one load (d) and one store (d).

To confirm the high agreement shown in FIG. 10, pose and optical flow models were also evaluated on training-set ground-truth labels from MPII and Sintel (e.g., as described in Butler et al., "A naturalistic open source movie for optical flow evaluation," in Computer Vision—ECCV 2012, Lecture Notes in Computer Science (2012)), respectively. The first 737 videos from the MPII training set and all 23 videos in the Sintel training set were used for evaluation. To generate the agreement metrics for the OpenPose network, the output of a conventional network was used as ground truth, and the output of the EvNet version of the network was evaluated based on the ground truth using the PCK metric. For example, the value 0.904 indicates that "90.4% of the time, the human joint predicted by the EvNet is close to the joint predicted by the conventional model." The metrics for the YOLO network and the PWC-Net network were calculated using a similar technique using the mAP50 and EPE metrics. PSNR can be characterized as a measure of how close two images are. For example, a PSNR around 40 dB indicates strong agreement between the ground truth and predicted images.

FIG. 11 shows examples of efficiency improvements that can be realized using mechanisms described herein to modify existing neural networks in accordance with some embodiments of the disclosed subject matter, and metrics indicative of comparative performance of the networks with and without modifications. In FIG. 11, computation savings, conventional metric performance, and event metric performance are shown from the evaluations described above in connection with FIG. 10. For both models only minor reductions in metric performance are observed. As shown in FIG. 11, the high agreement on the auto-labelled data translates to similar metric performance on separate ground truth.

FIG. 12 shows examples of efficiency improvements that can be realized using mechanisms described herein to modify existing neural networks in accordance with some embodiments of the disclosed subject matter, and results of computer vision tasks generated by the networks with and without modifications. FIG. 12 includes example outputs from several conventional neural networks and versions of those networks that have been converted to EvNets. As shown in FIG. 12, may types of models can be modified and implemented as EvNets. The examples in FIG. 12 showing frame 153 from a video sequence with a static background. The frame shows a subject mid-jump (indicated by the blue region in the optical flow maps). The EvNet tracks the subject correctly, even under rapid motion. Additional results are included in Appendix A.

FIG. 13 shows examples of efficiency improvements that can be realized using mechanisms described herein and the impact of transmission policies with various levels of granularity in accordance with some embodiments of the disclosed subject matter. In FIG. 13, results for various implementations of the OpenPose network are shown with various thresholds, and different transmission policies. FIG. 13 shows results generated using the MPII auto-labelled dataset as inputs, and the effect of increasing the granularity of the policy. Both a spatial chunking policy (e.g., considering a group of neighboring neurons to determine when to transmit values downstream, as described above in connection with FIG. 6), and a policy that chunks along the channel dimension (e.g., using a Gumbel gate). In the chunked transmission policies, each neighborhood computes a mean of several |d|, and the thresholds were reduced to keep the accuracy from dropping significantly. The results show that increasing the chunk size reduces the operation savings. However, chunking may, in practice, allow more efficient execution on GPUs.

FIG. 14 shows an example of the computational cost at various layers of a particular network modified as an event neural network in accordance with some embodiments of the disclosed subject matter as a fraction of the computational cost of the network without modifications. The averages are taken over all videos and frames within a particular dataset split.

The computational cost of the OpenPose model is shown in FIG. 14 as a function of the layer depth (on the auto-labelled MPII dataset). The relative cost generally decreases deeper in the network. This highlights the benefits of leveraging repetition in the deep layers of the network, and not just near the input.

Note that mechanisms described herein that utilize a neuron-level transmission policy (e.g., are generally described in connection with use with a processor, such as a CPU, that are capable of relatively little parallel execution, while conventional GPU hardware is generally designed for massive parallel, block-wise computation with coarse control flow. An event network with neuron-level transmission can be expected to be inefficient under the computation model used by conventional GPUs. Accordingly, implementations on hardware designed for a high degree of parallel execution can be expected to provide superior performance with an alternative transmission policy, such as chunking. Note that event neurons do not need to operate by a common clock, as each neuron can operates independently—consuming new input as it arrives and transmitting output once it is computed. This permits an asynchronous, networked-based execution model in contrast to the ordered, frame-based model in conventional machine learning. Note that spiking neural networks share this asynchronous computation model, and have motivated the development of several novel hardware platforms (such as neuromorphic platforms designed for spiking neural networks that support on-chip learning and complex, nonlinear update rules within each neuron). By contrast, a neuromorphic platform designed for EvNets can be configured to compute simple linear functions, and can be expected to achieve a better performance/energy tradeoff. For example, circuitry that is used in a neuromorphic chip to implement elements of a spiking neural network can be eliminated.

For certain special cases of transmission policies (e.g., a threshold policy with h=0), the output of an event network can be guaranteed to be equal to that of an equivalent conventional network. As the transmission policy is configured to be selective (e.g., by increasing h), the efficiency of the event network improves, but its output can be expected to increasingly deviate from that of the conventional network. This behavior is described herein qualitatively (e.g., as shown in FIG. 13).

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as RAM, Flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, or any suitable media that is fleeting and devoid of any semblance of permanence during transmission, and/or any suitable intangible media.

It should be noted that, as used herein, the term mechanism can encompass hardware, software, firmware, or any suitable combination thereof.

It should be understood that the above-described steps of the processes of FIG. 7 can be executed or performed in any order or sequence not limited to the order and sequence shown and described in the figures. Also, some of the above steps of the processes of FIG. 7 can be executed or performed substantially simultaneously where appropriate or in parallel to reduce latency and processing times.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for using a neural network with improved efficiency, the method comprising:

receiving image data;

providing the image data to a trained neural network, the trained neural network comprising a plurality of neurons;

receiving, at a neuron of the plurality of neurons, a delta-based input $\Delta_{in}$ provided from a previous layer of the trained neural network;

generating, for the neuron, an output $g(\Delta_{in})$ of a linear transform g based on Ain;

generating, for the neuron, an updated value of a state variable a based on $g(\Delta_{in})$ and a value of the state variable a at a time when $\Delta_{in}$ is received;

generating, for the neuron, an output $f(a)$ of an activation function $f$ based on the updated value of the state variable a;

generating, for the neuron, an updated value of a state variable d based on a value of the state variable d, a value of a state variable b corresponding to a previous output of the activation function, and the output $f(a)$;

generating, for the neuron subsequent to updating the value of the state variable d, an updated value of the state variable b based on the output $f(a)$;

determining whether to transmit the value of the state variable d based on a transmission policy and the updated value of the state variable d;

in response to determining that the value of state variable d is to be transmitted, transmitting the value of the state variable d to a next layer of the trained neural network;

in response to transmitting the value of state variable d to the next layer, subtracting the transmitted value from the state variable d; and receiving an output from the trained neural network, wherein the output from the trained neural network represents a prediction based on the image data.

2. The method of claim 1, wherein the transmission policy is applied to each of the plurality of neurons individually, and comprises a threshold value h, and wherein determining whether to transmit the updated value of the state variable d based on the transmission policy and the value of the state variable d comprises determining whether |d| satisfies the threshold value h.

3. The method of claim 1, wherein image data is a frame of video data, and the previous output of the activation function was generated based on a prior frame of video data.

4. The method of claim 1, wherein the image data comprises data generated by an image sensor comprising a plurality of single photon detectors.

5. The method of claim 1, wherein the plurality of neurons are included in a single layer of the neural network, and wherein a state tensor a is associated with the single layer of the neural network, and stores the state variable a for each of the plurality of neurons.

6. The method of claim 1, wherein the value of the state variables a, b, and d are stored in memory and are associated with the neuron.

7. The method of claim 1, wherein the output comprises an image with higher dynamic range than the image data.

8. The method of claim 1, wherein the output comprises object detection information indicative of the location of one or more objects in the image data.

9. A system for using a neural network with improved efficiency, the system comprising:
  at least one processor that is configured to:
    receive image data;
    provide the image data to a trained neural network, the trained neural network comprising a plurality of neurons;
    receive, at a neuron of the plurality of neurons, a delta-based input $\Delta_{in}$ provided from a previous layer of the trained neural network;
    generate, for the neuron, an output $g(\Delta_{in})$ of a linear transform g based on $\Delta_{in}$;
    generate, for the neuron, an updated value of a state variable a based on $g(\Delta_{in})$ and a value of the state variable a at a time when $\Delta_{in}$ is received;
    generate, for the neuron, an output $f(a)$ of an activation function $f$ based on the updated value of the state variable a;
    generate, for the neuron, an updated value of a state variable d based on a value of the state variable d, a value of a state variable b corresponding to a previous output of the activation function, and the output $f(a)$;
    generate, for the neuron subsequent to updating the value of the state variable d, an updated value of the state variable b based on the output $f(a)$;
    determine whether to transmit the value of the state variable d based on a transmission policy and the updated value of the state variable d;
    in response to determining that the value of state variable d is to be transmitted, transmit the value of the state variable d to a next layer of the trained neural network;
    in response to transmitting the value of state variable d to the next layer, subtracting the transmitted value from the state variable d; and
    receive an output from the trained neural network, wherein the output from the trained neural network represents a prediction based on the image data.

10. The system of claim 9, wherein the transmission policy is applied to no more than one neuron, and comprises a threshold value h, and
  wherein the at least one processor is further configured to:
    determine whether |d| satisfies the threshold value h.

11. The system of claim 9, wherein image data is a frame of video data, and the previous output of the activation function was generated based on a prior frame of video data.

12. The system of claim 9, wherein the image data comprises data generated by an image sensor comprising a plurality of single photon detectors.

13. The system of claim 9, wherein the plurality of neurons are included in a single layer of the neural network, and wherein a state vector a is associated with the single layer of the neural network, and stores the state variable a for each of the plurality of neurons.

14. The system of claim 9, further comprising memory, wherein the value of the state variables a, b, and d are stored in the memory and are associated with the neuron.

15. The system of claim 9, wherein the output comprises an image with higher dynamic range than the image data.

16. The system of claim 9, wherein the output comprises object detection information indicative of the location of one or more objects in the image data.

17. A method for modifying a neural network to operate with improved efficiency, the method comprising:
  receiving a trained neural network;
  adding a first gate layer configured to:
    receive a plurality of values and output a plurality of differentials to a layer comprising a corresponding plurality of neurons, each configured to perform a linear transform, where each differential is based on a difference between a value of the plurality of values and a corresponding previously received value of a plurality of previously received values;
  adding an accumulator layer configured to:
    receive an output from each of the plurality of neurons;
    store a corresponding plurality of state variables a based on the output received from the corresponding neuron; and
    output current values of the plurality of state variables a to a layer configured to perform a non-linear activation; and
  adding a second gate layer configured to:
    generate, in connection with each of the plurality of neurons, an updated value of a state variable d based on a value of the state variable d, a value of a state variable b corresponding to a previous output of the non-linear activation function, and the output the non-linear activation function; and
    generate, for the neuron subsequent to updating the value of the state variable d, an updated value of the state variable b based on the output of the non-linear activation function; and
  storing a modified version of the neural network including at least the first gate layer, the accumulator layer, and the second gate layer in memory.

18. The method of claim 17, further comprising:
  causing a transmission policy to be applied to each neuron, the transmission policy comprising a threshold value h, and causing transmission of the value of the state variable d to be inhibited unless |d|>h.

19. The method of claim 18, further comprising:
  configuring the second gate layer to set to transmit the updated value of the state variable d and subtract the transmitted value from the state variable d in response determining that the value of d satisfies the transmission policy.

* * * * *